United States Patent
Suzuki et al.

(10) Patent No.: US 10,514,886 B2
(45) Date of Patent: Dec. 24, 2019

(54) PLAYBACK SOUND PROVISION DEVICE

(71) Applicant: TOYOTA JIDOSHA KABUSHIKI KAISHA, Toyota-shi, Aichi-ken (JP)

(72) Inventors: Takahiro Suzuki, Nagoya (JP); Yukari Nakane, Toyota (JP); Chisato Komurasaki, Nagoya (JP); Hiroshi Ishii, Cambridge, MA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/945,127

(22) Filed: Apr. 4, 2018

(65) Prior Publication Data
US 2018/0293047 A1 Oct. 11, 2018

(30) Foreign Application Priority Data

Apr. 7, 2017 (JP) ................. 2017-076483

(51) Int. Cl.
| | |
|---|---|
| G06F 3/16 | (2006.01) |
| G10L 21/00 | (2013.01) |
| G10L 21/02 | (2013.01) |
| G10L 21/003 | (2013.01) |
| G10L 21/013 | (2013.01) |
| G10L 21/0316 | (2013.01) |
| G10L 21/043 | (2013.01) |
| H04R 3/00 | (2006.01) |

(52) U.S. Cl.
CPC .............. *G06F 3/165* (2013.01); *G10L 21/00* (2013.01); *G10L 21/0205* (2013.01); *H04R 3/00* (2013.01); *G10L 21/003* (2013.01); *G10L 21/013* (2013.01); *G10L 21/0316* (2013.01); *G10L 21/043* (2013.01); *H04R 2499/13* (2013.01)

(58) Field of Classification Search
CPC ..... G06F 3/165; G10L 21/00; G10L 21/0205; G10L 21/003; G10L 21/013; G10L 21/0316; G10L 21/043; H04R 2499/13
See application file for complete search history.

(56) References Cited

U.S. PATENT DOCUMENTS

2009/0249945 A1  10/2009  Yamashita et al.

FOREIGN PATENT DOCUMENTS

| JP | 2001-67850 A | 3/2001 |
|---|---|---|
| JP | 2003-097955 A | 4/2003 |
| JP | 2004-251989 A | 9/2004 |
| JP | 2006-092430 A | 4/2006 |
| JP | 2006-171133 A | 6/2006 |
| JP | 2006-313619 A | 11/2006 |
| JP | 2013-072759 A | 4/2013 |
| JP | 2015-133008 A | 7/2015 |

*Primary Examiner* — David L Ton
(74) *Attorney, Agent, or Firm* — Oliff PLC

(57) ABSTRACT

A playback sound provision device includes: a surrounding information detection device configured to detect detection information including information on a three-dimensional object or a planar display around the vehicle; and a control device configured to determine a playback method for a playback sound based on a music piece based on the detection information when a predetermined target is included in the detection information, and provide the playback sound based on the playback method.

6 Claims, 10 Drawing Sheets

PLAYBACK SOUND PROVISION DEVICE

INCORPORATION BY REFERENCE

The disclosure of Japanese Patent Application No. 2017-076483 filed on Apr. 7, 2017 including the specification, drawings and abstract is incorporated herein by reference in its entirety.

BACKGROUND

1. Technical Field

The present disclosure relates to a playback sound provision device that provides a playback sound of music or the like for a vehicle.

2. Description of Related Art

A music playback device that is mounted on a vehicle such as an automobile and provides various music pieces to occupants of a vehicle has been known. For example, Japanese Unexamined Patent Application Publication No. 2003-97955 (JP 2003-97955 A) describes an in-vehicle information provision device that provides content to occupants of a vehicle at a timing according to the content of information. When provision of content and narration is performed by an event program of which a starting point has been set in advance, the in-vehicle information provision device described in JP 2003-97955 A changes a timing at which provision of the narration and the content according to a type of content is started.

SUMMARY

For a music playback device for a vehicle, providing content including music in the vehicle in order to cause an occupant of the vehicle such as a driver to feel comfortable when driving is conceivable. By listening to the provided music, there is a possibility of the occupant of the vehicle feeling pleasant thereby alleviating a feeling of restraint during movement and feeling comfortable when driving.

However, it is conceivable that when a consistent piece of music is played back with the same tone, the occupant of the vehicle gets accustomed to a playback sound, and the pleasant feeling obtained from the music playback reduces from a level felt when the occupant has listened to the music for the first time. It is conceivable that when a pleasant feeling obtained from the music playback reduces, enjoyment of driving also reduces. From the above, a music playback device for a vehicle needs to be improved from the viewpoint of giving a sense of refreshment to the occupant of the vehicle and causing driving to be felt more comfortable.

The present disclosure provides a playback sound provision device that can give a sense of refreshment to an occupant of a vehicle.

A first aspect of the present disclosure relates to a playback sound provision device including: a surrounding information detection device configured to detect detection information including information on a three-dimensional object or a planar display around the vehicle; and a control device configured to determine a playback method for a playback sound based on a music piece based on the detection information when a predetermined target is included in the detection information, and provide the playback sound based on the playback method.

In the playback sound provision device according to the first aspect of the present disclosure, the playback method may include at least one of playing back the playback sound by changing an amplitude of the playback sound, playing back the playback sound by changing a pitch of the playback sound, playing back the playback sound by changing a playback speed of the playback sound, playing back the playback sound by changing a progressing order of a plurality of parts obtained by dividing the playback sound by time, playing back the playback sound by changing sound quality of the playback sound, playing back the playback sound by changing a dynamic range of the playback sound, playing back the playback sound by superimposing a delayed sound obtained by delaying the playback sound on the playback sound, and playing back the playback sound by superimposing a noise on the playback sound.

In the playback sound provision device according to the first aspect of the present disclosure, a specific aspect of the playback method for the playback sound based on the detection information may be changed by a user, and the playback sound provision device may be configured to store the specific aspect of the playback method for the playback sound changed by the user.

The playback sound provision device according to the first aspect of the present disclosure may be configured to transmit the specific aspect of the playback method for the playback sound changed by the user to a communication network.

The playback sound provision device according to the first aspect of the present disclosure may be configured to acquire the specific aspect of the playback method for the playback sound from a communication network.

According to the first aspect of the present disclosure, it is possible to determine the playback method for the playback sound based on the detection information.

A second aspect of the present disclosure relates to a playback sound provision device including a surrounding information detection device configured to detect detection information including information on a three-dimensional object or a planar display around the vehicle; and a control device configured to playback a playback sound based on a music piece based on the detection information when a predetermined target is included in the detection information, the playback sound includes a sound effect.

In the playback sound provision device according to the second aspect of the present disclosure, the sound effect may include voice obtained by reading text information acquired from a communication network in a rap tone.

According to the aspects of the present disclosure, it is possible to provide a playback sound provision device that can give a sense of refreshment to the occupant of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
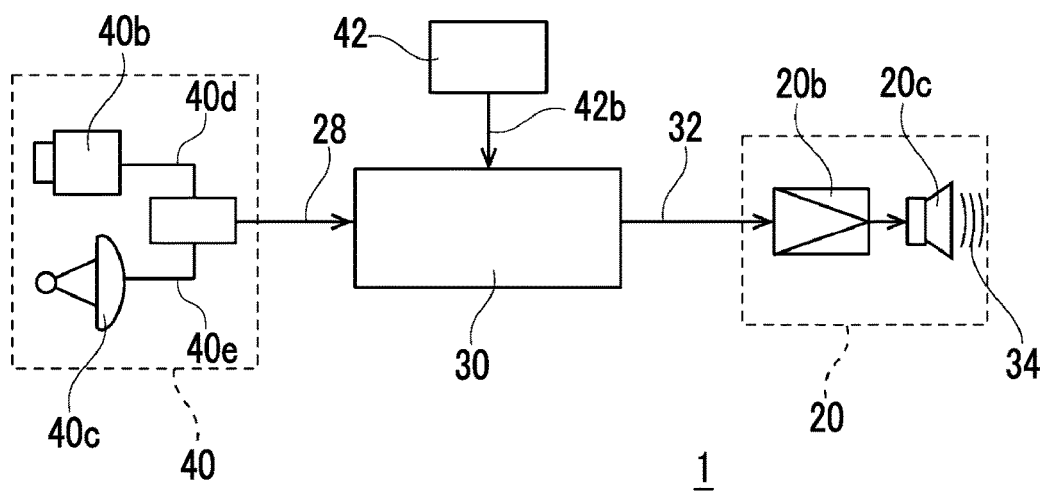
FIG. 1 is a block diagram illustrating a configuration of a vehicle playback sound provision device according to a first embodiment.

Hereinafter, the present disclosure will be described with reference to the drawings based on preferred embodiments. In the embodiments and modification examples, the same or equivalent components and members are denoted with the same reference numerals, and redundant descriptions are omitted as appropriate. Dimensions of the members in each drawing are shown to be appropriately enlarged and reduced in order to facilitate understanding. In each drawing, some of members which are not significant for description of the embodiments are omitted. Terms including ordinal numbers such as first and second are used to describe various components, but the terms are used solely for distinguishing one component from the other components, and components are not limited by the terms.

From the viewpoint of causing the occupant of the vehicle to feel comfortable when driving, continuing to give a sense of refreshment to the occupant of the vehicle in order to cause the occupant of the vehicle to feel pleasant obtained from music playback in a device that provides a playback sound for a vehicle is conceivable. It is desirable to prevent the occupant of the vehicle from becoming accustomed to the playback sound. Therefore, it is desirable that a sense of refreshment is given to the occupant of the vehicle even with a consistent piece of music. From the above, the sense of freshness can be maintained by changing a playback method or causing a sound effect to be included.

As an example, producing a set list of music pieces to be played back according to a traveling time up to a destination or a traveling route is conceivable. In this case, it is desirable to always change the number of selected songs in the set list according to a degree of traffic congestion of a road. Restructuring the music piece by causing a mood, prefer- ence, a surrounding environment, or the like of the occupant of the vehicle listening to the music piece to be reflected in the music piece itself is also conceivable.

As another example, presenting a pleasant driving with music matching the type or the situation of a travel road such as an expressway, an urban road, a road at which the sea can be seen, or a road at which a rural scenery can be seen, or a speed of the vehicle is considered. For example, in the case of the urban road, providing a music piece such that consciousness of a driver concentrates on driving, or providing a music piece related to an urban region is conceivable. In the case of the expressway, providing a music piece having a sense of speed so that a traveling feeling of the vehicle at a high speed can be perceived is conceivable. In the case of the road at which the sea can be seen, providing a music piece suitable for the sea or related to the sea or a music piece being reminiscent of an image of a bright sun is conceivable. According to the situation, providing a music piece with a slow tempo to induce a driver to travel safely is conceivable.

Selecting music according to an occupant of a vehicle, a destination, a road to travel, a scenery, or the like when a user travels on a vehicle is conceivable. Further, taking various objects (street trees, street lights, signboards, oncoming vehicles, or the like) that can be seen from a vehicle window during traveling as a sound effect according to a rhythm of the song being played back is conceivable. As described above, it is possible to perform a music presentation corresponding to a feeling toward a movement destination. As described above, providing a sense of a street becoming a part of the music and causing the occupant of the vehicle to feel a sense of unity with the outside of the vehicle is conceivable.

As another example, acquiring objects around a traveling subject vehicle such as a street light, a street tree, or an oncoming vehicle that can be seen from a vehicle window using a camera, a sensor, or the like, and adding a sound effect according to an acquisition result of the surrounding objects is conceivable. In this case, for example, adding a bass sound as a sound effect when the street lights are arranged regularly is conceivable. Further, as another example, causing a driver to listen to a direction of turning at an intersection, a position of the subject vehicle in a lane, or the like as a sound effect by using a speaker with high directivity is conceivable. That is, utilizing the sound effect as described above as an aid for driving is conceivable.

Based on the above idea, a playback sound provision device for a vehicle that provides playback sound based on a music piece has been devised. The device detects surrounding information including information on a three-dimensional object or a planar display around a traveling subject vehicle, determines a playback method for the playback sound based on the detected surrounding information, plays back the playback sound based on the music piece using the playback method, and provides the playback sound. In particular, when a predetermined target (hereinafter referred to as a target) is included in the detected surrounding information, the device can change the playback method for the playback sound according to a feature extracted from the target.

According to the device, for example, it is possible to play back the playback sound based on the music piece using a playback method in which a traveling state of another vehicle around the traveling subject vehicle or a situation such as a sign and a street has been reflected. As a result, it is possible to cause occupants of the vehicle to feel a sense of refreshment by providing a playback sound with a more realistic feeling, and it is possible to increase a level of impression from driving.

The vehicle playback sound provision device according to each embodiment has been devised based on the above-described idea, and detailed configuration thereof will be described below.

First Embodiment

A vehicle playback sound provision device 1 according to a first embodiment will be described with reference to FIGS. 1 to 5. FIG. 1 is a block diagram illustrating an example of a configuration of the vehicle playback sound provision device 1 according to the first embodiment. As illustrated in FIG. 1, the vehicle playback sound provision device 1 according to the first embodiment mainly includes a music piece provision device 42, a surrounding information detection device 40, a control device 30, and a playback sound output device 20.

First, a flow of playback sound in the vehicle playback sound provision device 1 will be described. A music piece source signal 42b provided from the music piece provision device 42 is converted into a music piece signal 42c by the music piece acquisition unit 30b. The music piece signal 42c is played back by the playback sound playback unit 30e to become a playback source signal 32b. The playback source signal 32b is converted into a playback sound signal 32 by the playback sound provision unit 30f and is provided to the playback sound output device 20. The playback sound signal 32 is output as playback sound 34 by the playback sound output device 20.

An operation of the vehicle playback sound provision device 1 will be briefly described. The vehicle playback sound provision device 1 captures detection information 28 including, for example, an image obtained by imaging the surroundings of the vehicle and determines whether or not a predetermined target is included in the detection information 28. When the target is included, the vehicle playback sound provision device 1 extracts a predetermined feature such as a size or a distance of the target from the detection information 28. After the feature is extracted, the vehicle playback sound provision device 1 codes and combines a type and a feature of the target, and specifies the target code. When the target code is specified, the vehicle playback sound provision device 1 specifies a playback method control signal through table processing using the target code as a key. When the playback method control signal is specified, the vehicle playback sound provision device 1 plays back the music piece provided from the music piece provision device 42 using a playback method according to the playback method control signal, generates a playback sound signal 32, and outputs the playback sound signal 32 to the playback sound output device 20. The playback sound output device 20 outputs the playback sound 34 in the vehicle. Respective components will be described in detail below.

Music Piece Provision Device

The music piece provision device 42 is a device that provides music piece that is a basis of the playback sound 34 to be provided by the vehicle playback sound provision device 1. The music piece provision device 42 may include one or a plurality of sound sources. The sound source is described above is not particularly limited, and may be, for example, a sound source that is provided by a recording and playback medium such as a tape recorder or a memory card, a sound source that is provided by a playback medium such as a CD or a DVD, a sound source that is provided by a music player or a smartphone, a sound source that is distributed via a broadcast such as a television or a radio or over a network, a sound source that is distributed over a communication network (for example, the Internet) such as a moving image distribution service or a music distribution service, a sound source that is provided by output data of Musical Instrument Digital Interface (MIDI) controlled by a computer, a sound source that is provided by an electronic musical instrument such as a synthesizer controlled by a computer, or a sound source that is provided by singing of electronic voice controlled by a computer. The music piece provision device 42 provides the music piece provided from the sound source as a music piece source signal 42b to the control device 30. The music piece source signal 42b may be an analog signal or a digital signal.

Surrounding Information Detection Device

The surrounding information detection device 40 detects an image of surroundings of the vehicle or radar information. The surrounding information detection device 40 may include, for example, at least one of a camera, a laser sensor, and a radar device. For example, in the first embodiment, the surrounding information detection device 40 includes a stereo camera 40b and a radar device 40c. The surrounding information detection device 40 outputs detection information 28 obtained by integrating an imaging result 40d of the stereo camera 40b and a detection result 40e of the radar device 40c into integral data to the control device 30. The imaging result 40d of the stereo camera 40b may include an image of a surrounding three-dimensional object or a planar display. The detection result 40e of the radar device 40c may mainly include information such as a distance between the vehicle and the surrounding three-dimensional object, a size of the three-dimensional object, a distance between a plurality of three-dimensional objects around a traveling subject vehicle, or a moving speed of the three-dimensional object.

The control device 30 acquires the music piece source signal 42b from the music piece provision device 42 and the detection information 28 from the surrounding information detection device 40. The control device 30 generates the playback sound signal 32 using a playback method according to the music piece source signal 42b and the detection information 28 and provides the playback sound signal 32 to the playback sound output device 20. The playback sound signal 32 is an audio signal arranged and played back using a predetermined method.

Playback Sound Output Device

The playback sound output device 20 converts the playback sound signal 32 into the playback sound 34 and outputs the playback sound 34 to the inside of the vehicle. The playback sound output device 20 includes an amplifier 20b and a speaker 20c that is driven by the amplifier 20b. The amplifier 20b amplifies the playback sound signal 32 provided from the control device 30 to such an extent that an occupant of the vehicle can appreciate the playback sound signal 32 and drives the speaker 20c. The speaker 20c is driven by the amplifier 20b and outputs the playback sound 34 to the inside of the vehicle. The playback sound signal 32 may be an analog signal or a digital signal. When the playback sound signal 32 is a digital signal, the playback sound output device 20 may include a DA converter.

Control Device

Figure 2:
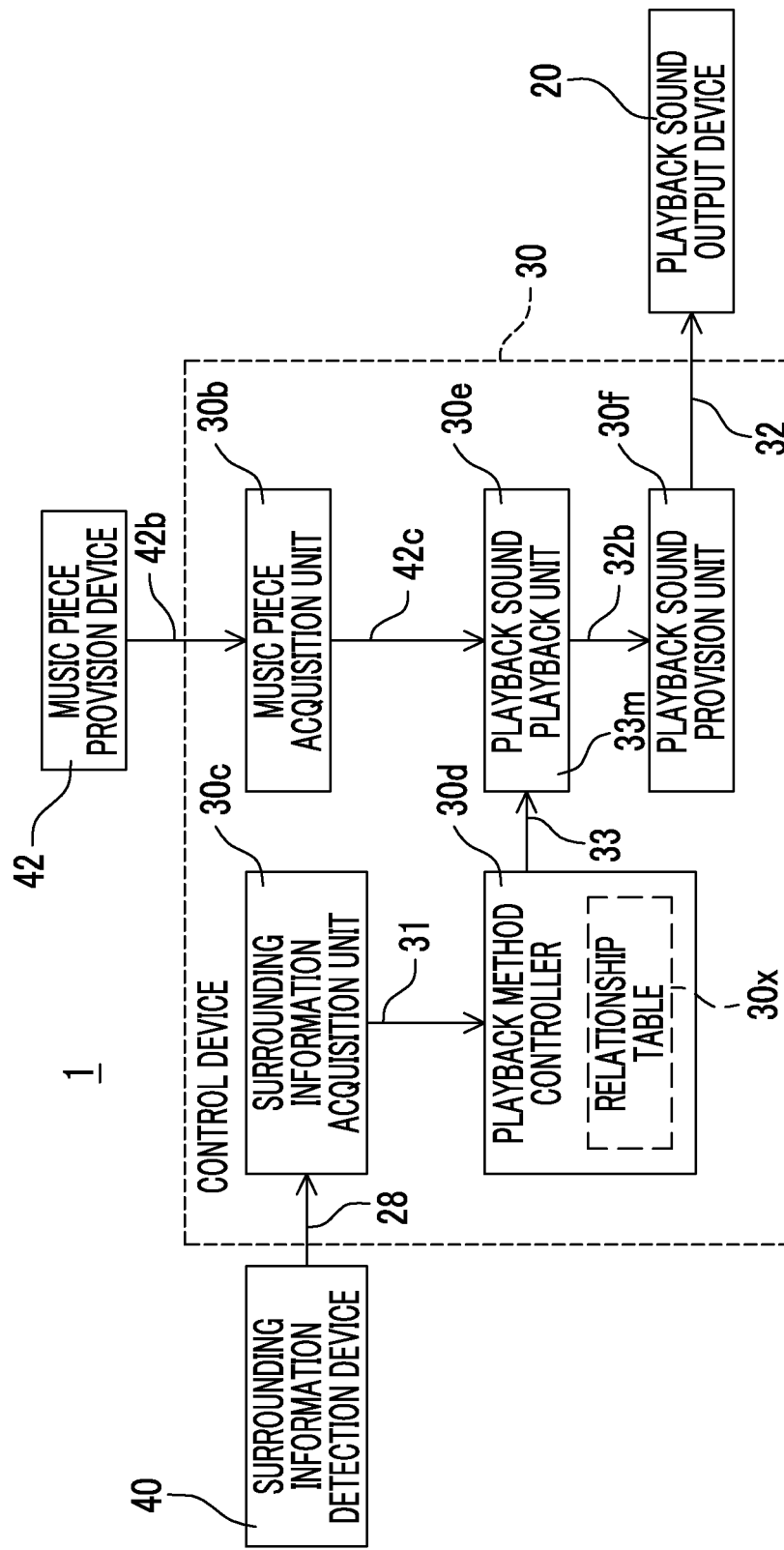
FIG. 2 is a block diagram illustrating a configuration of a control device of the vehicle playback sound provision device in FIG. 1.
Figure 3:
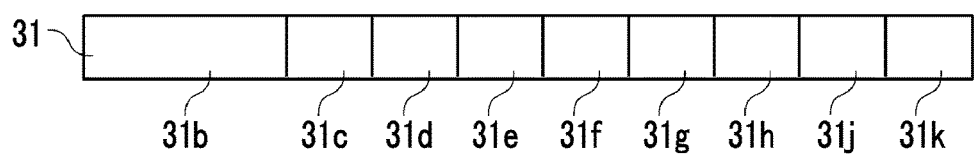
FIG. 3 is a conceptual diagram conceptually illustrating an example of a target code of the vehicle playback sound provision device in FIG. 1.
Figure 4:
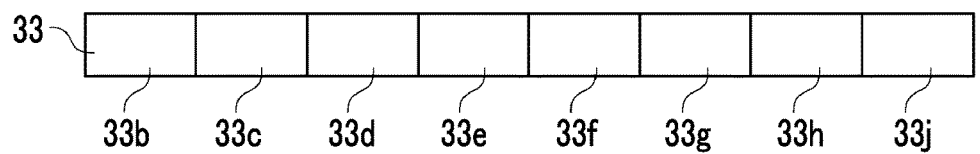
FIG. 4 is a conceptual diagram conceptually illustrating an example of a playback method control signal of the vehicle playback sound provision device in FIG. 1.

The control device 30 will be described with reference to FIGS. 2 to 4. FIG. 2 is a block diagram illustrating the control device 30. Each of the blocks of the control device 30 illustrated in FIG. 2 and control devices 50, 60 described below, and sub blocks constituting each block can be realized by an element mainly including a central processing unit (CPU) of a computer or a mechanical device in terms of hardware, and can be realized by a computer program or the like in terms of software. However, here, functional blocks realized in cooperation of the above-described elements are depicted. Therefore, it will be understood by those skilled in the art that the functional blocks can be realized in various ways in a combination of hardware and software.

As illustrated in FIG. 2, the control device 30 mainly includes a music piece acquisition unit 30b, a surrounding information acquisition unit 30c, a playback method controller 30d, a playback sound playback unit 30e, and a playback sound provision unit 30f. The playback method controller 30d includes a relationship table 30x.

The music piece acquisition unit 30b acquires the music piece source signal 42b from the music piece provision device 42, adjusts a data format, and converts the music piece source signal 42b into a music piece signal 42c that can be played back by the playback sound playback unit 30e. The music piece acquisition unit 30b provides the converted music piece signal 42c to the playback sound playback unit 30e. The music piece acquisition unit 30b may control the music piece provision device 42 so that the music piece provision device 42 provides the music piece source signal 42b of the designated music piece.

The surrounding information acquisition unit 30c acquires the imaging result 40d of the stereo camera 40b and the detection result 40e of the radar device 40c as the detection information 28 from the surrounding information detection device 40. The surrounding information acquisition unit 30c may control the surrounding information detection device 40 so that the surrounding information detection device 40 detects the detection information 28 in a designated direction.

The surrounding information acquisition unit 30c determines whether or not the detection information 28 includes one or a plurality of predetermined targets (hereinafter referred to as designated targets). The designated target may be, for example, a road on which the vehicle travels, and a three-dimensional object or a planar display provided around the road. The designated target is not limited, and may include, for example, a target that is visible from a vehicle window. The designated target may include a static target or a dynamic target.

The static target may include a tunnel, a street tree, a street light, a pedestrian bridge, a sign, a bridge, a balustrade, a pier, a crossover, a landmark, a building, a tower, a crosswalk, an intersection, a lane line, a toll gate such as an ETC gate, a median strip, a guard rail, a color or a state of a road, a destination, or the like. The dynamic target may include a land vehicle traveling on a road such as an oncoming vehicle or a parallel traveling vehicle, a rail car, a water moving body such as a ship, an air moving body such as an airplane, or the like. The dynamic target may include a pedestrian, a runner, a bicycle, a motorcycle, or the like.

The surrounding information acquisition unit 30c determines whether or not the designated target is included in the detection information 28 through pattern recognition or contour recognition. When the designated target is included in the detection information 28, the surrounding information acquisition unit 30c specifies a code 31b indicating a type of a plurality of bits (for example, 7 bits) corresponding to a type of the target, and an attribute code of a plurality of bits (for example, 2 to 3 bits). Although content of the attribute code is not particularly limited, the attribute code of the first embodiment includes, for example, a code 31c indicating a size, a code 31d indicating a height, a code 31e indicating a color, a code 31f indicating a distance, a code 31g indicating whether the target is singular or plural, a code 31h indicating the presence or absence of regularity, a code 31j indicating a moving speed, and a code 31k indicating an interval.

The surrounding information acquisition unit 30c integrates the attribute code and the type code into a target code 31 which is one information code. FIG. 3 is a conceptual diagram conceptually illustrating an example of the target code 31.

The playback method controller 30d specifies, for example, the corresponding playback method 33m from the type and the attribute of the designated target. The playback method controller 30d specifies a playback method control signal 33 obtained by coding the playback method 33m in order to control the playback sound playback unit 30e. The playback method controller 30d determines the target code 31 and the playback method control signal 33 corresponding to the target code 31 in advance, and stores the target code 31 and the playback method control signal 33 in the relationship table 30x. That is, the relationship table 30x is a database in which a relationship between the target code 31 and the playback method control signal 33 is tabulated. The playback method controller 30d can acquire the playback method control signal 33 from the relationship table 30x through table processing using the target code 31 as a key.

The playback method control signal 33 will be described. FIG. 4 is a conceptual diagram conceptually illustrating an example of the playback method control signal 33. As described above, the playback method control signal 33 is a signal for controlling the playback sound playback unit 30e. The playback method control signal 33 includes, for example, an amplitude code 33b, a pitch code 33c, a speed code 33d, a progress code 33e, a filter code 33f, a D range code 33g, an echo code 33h, and a noise code 33j.

The amplitude code 33b is a control signal for changing the amplitude of the playback sound. For example, it is possible to control a change pattern for changing the amplitude of the playback sound with time using the amplitude code 33b. For example, it is possible to realize playback of a rhythmic playback sound by changing the amplitude of the playback sound according to a predetermined rhythm. For example, the amplitude code 33b can express four types of amplitude change patterns when the amplitude code 33b has 2-bit width, and 16 types of amplitude change patterns when the amplitude code 33b has a 4-bit width. The bit width of the amplitude code 33b can be set according to the number of types of desired change patterns.

The pitch code 33c is a control signal for changing the pitch without changing the playback speed of the playback sound. For example, it is possible to control a change pattern for changing the pitch of the playback sound with time using the pitch code 33c. As an example, it is possible to realize playback in which vibrato is added to the playback sound by changing the pitch of playback sound with small increments in a short period. For example, the pitch code 33c can express four types of pitch change patterns when the pitch code 33c has a 2-bit width, and 16 types of pitch change patterns when the pitch code 33c has a 4-bit width. The bit width of the pitch code 33c can be set according to the number of types of desired change patterns.

The speed code 33d is a control signal for changing a playback speed without changing the pitch of the playback sound. For example, it is possible to control a change pattern for changing the playback speed of the playback sound with time using the speed code 33d. For example, the speed code 33d can express four types of change patterns of the playback speed when the speed code 33d has a 2-bit width, and 16 types of change patterns of the playback speed when the speed code 33d has a 4-bit width. The bit width of the speed code 33d can be set according to the number of types of desired change patterns. For example, by periodically changing the playback speed and the pitch of the playback sound, it is possible to realize playback in which tremolo has been added to the playback sound.

The progress code 33e is a control signal for dividing the playback sound into a plurality of parts through time division and changing a progressing order of the divided parts. For example, control of a pattern of a playback order such as control to for playing back one of the parts repeatedly, control for playing back one part of the parts in a reverse direction, control for changing an order of the parts is performed. For example, it is possible to realize scratch playback by controlling for playing back the one part repeatedly. For example, the progress code 33e can express four types of change patterns of the progressing order when the progress code 33e has a 2-bit width, and 16 types of change patterns of the progressing order when the progress code 33e has a 4-bit width. The bit width of the progress code 33e can be set according to the number of types of desired change patterns.

The filter code 33f is a control signal for changing filter characteristics of a filter through which the playback sound passes. For example, it is possible to control the change pattern for changing sound quality of the playback sound with time using the filter code 33f. As an example, it is possible to play back the playback sound as a muffled sound by relatively suppressing a treble and to play back the playback sound as a clear sound by emphasizing a bass and a treble. For example, the filter code 33f can express four types of change patterns of filter characteristics when the filter code 33f has a 2-bit width, and 16 types of change patterns of filter characteristics when the filter code 33f has a 4-bit width. The bit width of the filter code 33f can be set according to the number of types of desired change patterns.

The D range code 33g is a control signal for changing the dynamic range of the playback sound. For example, it is possible to control the change pattern for changing the dynamic range of the playback sound with time using the D range code 33g. As an example, it is possible to play back the playback sound as a sound with calm feeling by narrowing the dynamic range and to play back the playback sound as a sound with lively feeling by widening the dynamic range. For example, the D range code 33g can express four types of change patterns of the dynamic range when the D range code 33g has a 2-bit width, and 16 types of change patterns of the dynamic range when the D range code 33g has a 4-bit width. The bit width of the D range code 33g can be set according to the number of types of desired change patterns.

The echo code 33h is a control signal for superimposing a delayed sound obtained by delaying the playback sound on the playback sound. For example, it is possible to control a change pattern of a delay time and an amplitude of the delayed sound using the echo code 33h. For example, the echo code 33h can express four types of change patterns of the echo when the echo code 33h has a 2-bit width, and 16 types of change patterns of the echo when the echo code 33h has a 4-bit width. The bit width of the echo code 33h can be set according to the number of types of desired change patterns.

The noise code 33j is a control signal for superimposing a noise on the playback sound. It is possible to control a change pattern of a type and an amplitude of the noise using the noise code 33j. For example, the noise code 33j can express four types of change patterns when the noise code 33j has a 2-bit width, and 16 types of change patterns when the noise code 33j has a 4-bit width. The bit width of the noise code 33j can be set according to the number of types of desired change patterns.

The playback sound playback unit 30e arranges the music piece signal according to the playback method control signal 33, plays back the music piece signal, and converts the music piece signal into the playback source signal 32b. The playback sound playback unit 30e may change the amplitude of the playback sound according to the change pattern corresponding to the amplitude code 33b. The playback sound playback unit 30e may change the pitch of the playback sound according to the change pattern corresponding to the pitch code 33c. The playback sound playback unit 30e may change the playback speed of the playback sound according to the change pattern corresponding to the speed code 33d. The playback sound playback unit 30e may change the playback order of the playback sound according to the corresponding change pattern according to the progress code 33e.

The playback sound playback unit 30e may change the sound quality of the playback sound according to the corresponding change pattern corresponding to the filter code 33f. The playback sound playback unit 30e may change the dynamic range of the playback sound according to the corresponding change pattern corresponding to the D range code 33g. The playback sound playback unit 30e may change a delay time and an amplitude of delayed sound of the playback sound according to the corresponding change pattern corresponding to the echo code 33h. The playback sound playback unit 30e may change a type and an amplitude of noise of the playback sound according to the corresponding change pattern corresponding to the noise code 33j.

The playback sound provision unit 30f is an interface that converts the playback source signal 32b played back in the playback sound playback unit 30e into a playback sound signal 32 in a format conforming to an input specification of the playback sound output device 20 and provides the playback sound signal 32 to the playback sound output device 20. For example, when the playback sound output device 20 adopts an analog input, the playback sound provision unit 30f may provide the playback sound signal 32 converted into an analog signal to the playback sound output device 20.

First Operation

Figure 5:
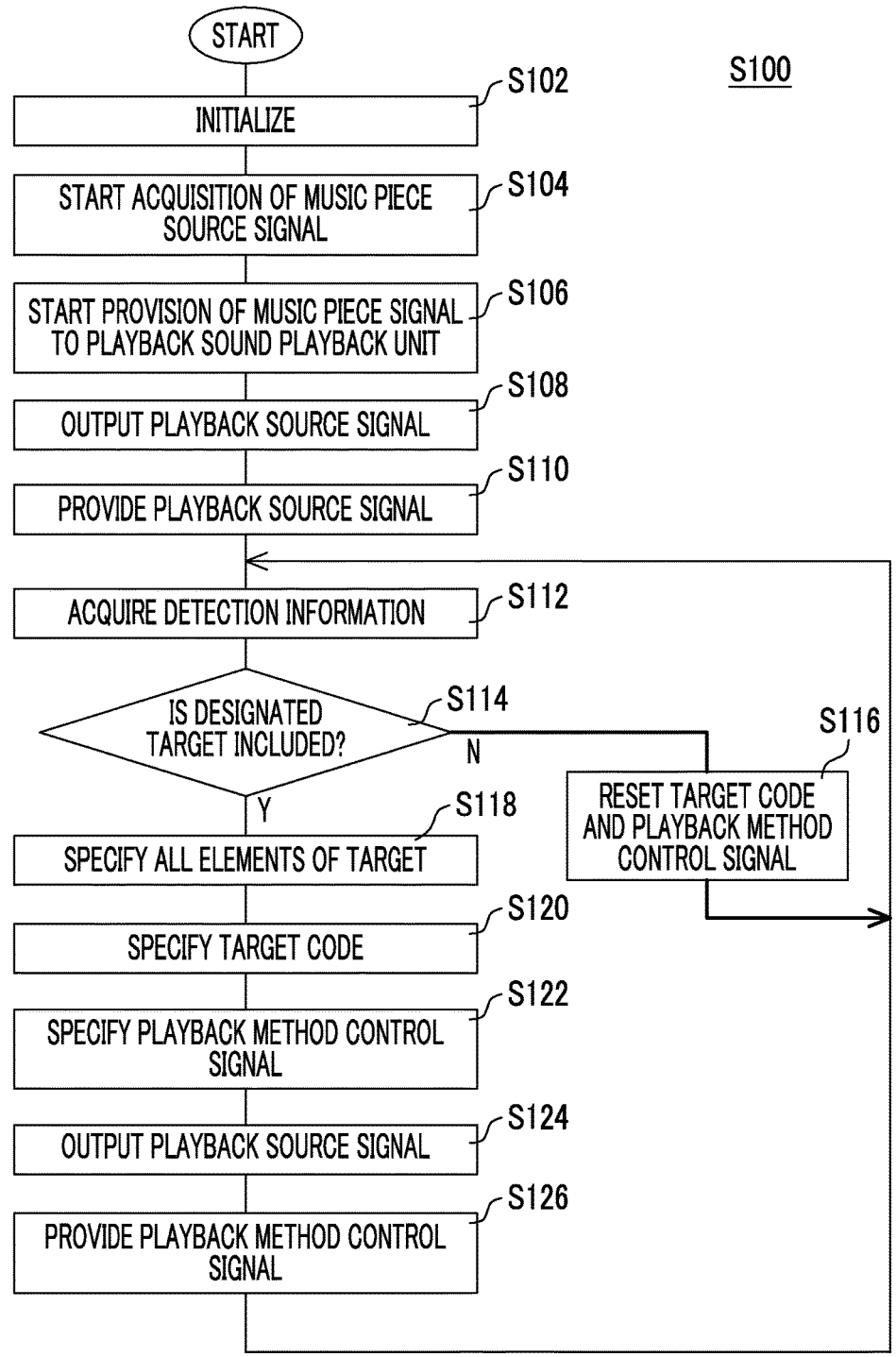
FIG. 5 is a flowchart illustrating an example of an operation of the vehicle playback sound provision device in FIG. 1.

An example of an operation of the vehicle playback sound provision device 1 according to the first embodiment configured as described above will be described. FIG. 5 is a flowchart illustrating a first operation of the vehicle playback sound provision device 1. FIG. 5 illustrates a process S100 of specifying the target code 31 based on the acquired detection information 28, specifying the playback method control signal 33 based on the specified target code 31, arranging the music piece source signal 42b according to the playback method control signal 33, playing back the music piece source signal 42b, and providing the music piece source signal 42b to the playback sound output device 20.

When the process S100 is started, the control device 30 initializes the vehicle playback sound provision device 1 (step S102). For example, in an initialized state, the target code 31 is set to a non-detected state in which the designated target is not detected, and the playback method control signal 33 is set to a normal state indicating a normal playback method 33m. The playback method 33m in a case where the playback source signal 32b is substantially the same as the music piece signal 42c is referred to as normal playback, and the playback sound at this time is referred to as normal playback sound. The music piece acquisition unit 30b starts acquisition of the music piece source signal 42b from the music piece provision device 42 (step S104). When the acquisition of the music piece source signal 42b is started, the acquisition of the music piece source signal 42b is continued until the process S100 is completed. When the acquisition of the music piece source signal is started, the control device 30 starts provision of the music piece signal 42c to the playback sound playback unit 30e (step S106). When the provision of the music piece signal 42c is started, the provision of the music piece signal 42c is continued until the process S100 is completed.

The playback sound playback unit 30e outputs the playback source signal 32b using the normal playback method 33m according to the playback method control signal 33 from the music piece signal 42c (step S108). The playback sound provision unit 30f converts the normally played playback source signal 32b into a playback sound signal 32 and provides the playback sound signal 32 to the playback sound output device 20 (step S110). In this state, the playback sound output device 20 normally outputs the music piece source signal 42b to the inside of the vehicle.

The control device 30 that has executed step S110 acquires the detection information 28 from the surrounding information detection device 40 using the surrounding information acquisition unit 30c (step S112). After acquiring the detection information, the control device 30 determines whether or not the designated target is included in the detection information 28 using the playback method controller 30d (step S114). When the designated target is not included in the detection information 28 (N in step S114), the control device 30 resets the target code 31 and the playback method control signal 33 to an initial state (step S116). The control device 30 that has executed step S116 returns the process to the start of step S112. That is, when the designated target is not included in the detection information 28, the music piece source signal 42b continues to be normally played back.

When the designated target is included in the detection information 28 (Y in step S114), the control device 30 analyzes a video of the detected target 14d included in the detection information 28 using the playback method controller 30d and specifies various elements such as a type, size, height, color, distance, quantity, regularity, and speed of the detected target 14d (step S118).

When the various elements are specified, the playback method controller 30d specifies each of various elements, that is, a code 31b indicating the type, a code 31c indicating the size, a code 31d indicating the height, a code 31e indicating the color, a code 31f indicating the distance, a code 31g indicating whether the element is singular or plural, a code 31h indicating the presence or absence of the regularity, a code 31j indicating the moving speed, and a code 31k indicating an interval (step S120). When the target code is specified, the playback method controller 30d specifies the playback method control signal 33 through table processing using the relationship table 30x using the target code 31 as a key (step S122).

When the playback method control signal is specified, the playback sound playback unit 30e plays back the music piece signal 42c according to the playback method control signal 33 and outputs the playback source signal 32b (step S124). After conversion into the playback source signal, the playback sound provision unit 30f converts the playback source signal 32b into a playback sound signal 32 in a predetermined format and provides the playback sound signal 32 to the playback sound output device 20 (step S126).

The control device 30 that has executed step S126 returns the process to the start of step S112. The process S100 can repeatedly execute steps S112 to S126. The process S100 is merely an example. Other processes may be added to the process, steps may be deleted or changed, or the order of the steps may be changed.

By executing steps S112 to S126, the control device 30 continues to provide the playback sound signal 32 played back using the method according to the playback method control signal 33 while the designated target is included in the detection information 28. Meanwhile, when approaching the detected target, the size, the height, and the distance of the detected target change. As the size, the height, and the distance of the detected target change, the target code 31 and the playback method control signal 33 change, and therefore, the playback method 33m for the playback sound playback unit 30e also changes.

As the vehicle passes by the vicinity of the detected target and moves away from the target, the size, the height, and the distance of the detected target 14d change. As the size, the height, and the distance of the detected target 14d change, the target code 31 and the playback method control signal 33 change, and therefore, the playback method 33m of the playback sound playback unit 30e also changes. As a result, as an example, the playback sound is initially normally played back, the playback sound is played back while gradually increasing the amplitude when the vehicle detects the target and approaches the target, the playback sound is played back while maximizing the amplitude when the vehicle approaches the target and gradually decreasing the amplitude when the vehicle moves away from the target the most, and the operation can return to the normal playback when the target is no longer detected.

Second Operation

An example of an operation when the designated target is a tunnel will be described. When the tunnel is included in the detection information 28, the control device 30 can perform the following control. The control device 30 may perform control to make the playback sound 34 feel like a muffled sound when the vehicle approaches a predetermined distance or less before the tunnel. In this case, for example, the control device 30 may perform control so that a high frequency range of the playback sound 34 is attenuated by the filter code 33f, and perform control so that the dynamic range is narrowed by the D range code 33g. When the vehicle enters the tunnel, the control device 30 may perform control so that delayed sound imitating echo sound of the tunnel is superimposed by the echo code 33h. Further, the moment when the vehicle has left the tunnel, the filter code 33f, the D range code 33g, and the echo code 33h may be reset and a change to normal playback may occur. By performing the control as described above, occupants of the vehicle can realize that the vehicle approaches the tunnel, passes through the tunnel, and leaves the tunnel through the auditory sense by means of the playback sound 34, and enjoyment of driving increases.

The control method as described above is not limited to the case where the designated target is the tunnel, and can also be applied to each designated target. For each designated target, the playback method 33m when the vehicle detects the target, when the vehicle approaches the target, when the vehicle approaches the target the most, when the vehicle gradually leaves the target, or when the vehicle does not detect the target can be set as the playback method control signal.

Third Operation

An example of an operation when the designated target is a street light will be described. When the street light is included in the detection information 28, the control device 30 can perform the following control. The control device 30 may change the amplitude or the pitch of the playback sound 34 when the vehicle passes by the street light. In this case, it is possible to change the playback method 33m for the amplitude or the pitch of the playback sound 34 using a control code such as the amplitude code 33b or the pitch code 33c. By doing as described above, each time the vehicle passes by street lights arranged at regular intervals, the playback sound 34 changes rhythmically, it is possible to realize passing by the street lights through the auditory sense, and enjoyment of driving increases.

The control device 30 may change the playback method 33m for the playback sound 34 when the vehicle passes under the street light. In this case, it is desirable that the surrounding information detection device 40 is able to detect an angle at which the target is looked up. By doing as described above, it is possible to control the playback method 33m according to the angle at which the target is looked up. For example, a degree of change in the amplitude or the pitch of the playback sound 34 may be switched according to the angle at which the target is looked up. The control device 30 may change the playback method 33m for the playback sound 34 when light of the street light illuminates the inside of the vehicle. In this case, it is desirable that the surrounding information detection device 40 includes a sensor that can detect that the light of the street light has illuminated the inside of the vehicle.

The control device 30 may periodically change the playback method 33m for the playback sound 34 according to a timing according to a rhythm of the visual change corresponding to a distance between a street light and another street light, and a vehicle speed. The playback method 33m for the playback sound 34 changes rhythmically, and accordingly, it is possible to feel enjoyment of driving through the auditory sense.

The control method as described above can be applied not only to a case where the designated target is a street light but also to another target. For each designated target, the playback method 33m, for example, when the vehicle passes by, when the vehicle passes under the target, and when the vehicle is in a specific angle relationship can be set as a playback method control signal.

Fourth Operation

An example of an operation when the designated target is a crosswalk will be described. When the crosswalk is included in the detection information 28, the control device 30 can perform the following control. The control device 30 may change the amplitude or the pitch of the playback sound 34 when the vehicle approaches the crosswalk. In this case, it is possible to change the playback method 33m for the amplitude or the pitch of the playback sound 34 using a control code such as the amplitude code 33b or the pitch code 33c. It is possible to realize the approach to the crosswalk from the auditory sense through a change in the playback sound 34. The control as described above can also be applied to other types of playback methods 33m, and can also be applied to other targets.

Fifth Operation

An example of an operation in a case where the designated target is a division line that divides a lane of a road will be described. The division line of the road includes, for example, an outer line of a lane provided on the side of a road or a lane boundary line such as a center line. The division lines of the road include a continuous line that is provided continuously and an intermittent line in which line segments having a fixed length are arranged at predetermined intervals. When the division line which is an intermittent line is included in the detection information 28, the control device 30 may periodically change the playback method 33m for the playback sound 34 at a timing according to a rhythm of visual change according to an interval between the division lines and a vehicle speed when the vehicle travels beside the division line. The playback method 33m for the playback sound 34 changes rhythmically, and therefore, it is possible to feel enjoyment of driving through the auditory sense. The control as described above can also be applied to other types of playback methods 33m, and can also be applied to other targets.

Sixth Operation

An example of an operation in a case where the designated target is a three-dimensional object at a destination will be described. In a case where the three-dimensional object at the destination is included in the detection information 28, the control device 30 may gradually change the playback method 33m for the playback sound 34 according to a visual change when the vehicle detects the three-dimensional object at the destination, when the vehicle gradually approaches the three-dimensional object at the destination, and when the vehicle reaches the three-dimensional object at the destination. In this case, it is possible to change the playback method 33m for amplitude or pitch of the playback sound 34 using a control code such as the amplitude code 33b or the pitch code 33c. It is possible to realize the approach to the destination from the auditory sense through a change in the playback sound 34. The control as described above can also be applied to other types of playback methods 33m, and can also be applied to other targets.

Seventh Operation

An example of an operation when the designated target is an oncoming vehicle will be described. In a case where the oncoming vehicle is included in the detection information 28, the playback method 33m for the playback sound 34 may be changed according to a visual change, for example, when the oncoming vehicle passes by the side of the subject vehicle. In this case, for example, it is possible to change the amplitude or the pitch of the playback sound 34 using the control code such as the amplitude code 33b and the pitch code 33c. It is possible to realize the oncoming vehicle having passed by from the auditory sense through a change in the playback sound 34. The control as described above can be executed corresponding to each of a case where an oncoming vehicle approaches the subject vehicle, a case where the oncoming vehicle passes by the subject vehicle, and the case where the oncoming vehicle moves away from the subject vehicle. In each case, the playback method 33m can be changed. In the control as described above, the playback method 33m can be changed according to features of the oncoming vehicle. For example, it is possible to change the playback method 33m according to a type of oncoming vehicle, a size of the oncoming vehicle such as a small car or a large car, a speed of the oncoming vehicle, occupant information such as the number of occupants on the oncoming vehicle, or the like. The control as described above can also be applied to other targets. In the control as described above, the playback method 33m may be changed by another control code.

Eighth Operation

An example of an operation when the designated target is a parallel traveling vehicle will be described. In a case where the parallel traveling vehicle is included in the detection information 28, the playback method 33m for the playback sound 34 may be changed according to a visual change, for example, when the subject vehicle and the parallel traveling vehicle travel in parallel, when the parallel traveling vehicle overtakes the subject vehicle, and when the parallel traveling vehicle is overtaken by the subject vehicle. In this case, for example, it is possible to change the amplitude or the pitch of the playback sound 34 using the control code such as the amplitude code 33b and the pitch code 33c. It is possible to realize the parallel traveling vehicle being in respective states from the auditory sense through a change in the playback sound 34. In the control as described above, the playback method 33m can be changed according to features of the parallel traveling vehicle. For example, it is possible to change the playback method 33m according to a type of parallel traveling vehicle, a size of the parallel traveling vehicle such as a small vehicle and a large vehicle, a speed of a parallel traveling vehicle, occupant information such as the number of occupants of a parallel traveling vehicle, or the like. The control as described above can also be applied to other targets. In the control as described above, the playback method 33m may be changed by another control code.

Ninth Operation

An example of an operation when the designated target is a pedestrian or a bicycle will be described. When the pedestrian or the bicycle is included in the detection information 28, the playback method 33m for the playback sound 34 may be changed according to a visual change, for example, when the pedestrian or the bicycle is traveling in parallel to the subject vehicle, when the pedestrian or the bicycle overtakes the subject vehicle, and when the pedestrian or the bicycle is overtaken by the subject vehicle. In this case, for example, it is possible to change the amplitude or the pitch of the playback sound 34 using the control code such as the amplitude code 33b and the pitch code 33c. It is possible to realize the pedestrian or the bicycle being in each state from the auditory sense through a change in the playback sound 34. In the control as described above, the playback method 33m can be changed according to the feature of a pedestrian or a bicycle. For example, the playback method 33m can be changed according to human information such as a speed of a pedestrian or a bicycle, an estimated age of a pedestrian or bicycle occupant, the number of pedestrians, the number of occupants of a bicycle, or the like. The control as described above can also be applied to other targets. In the control as described above, the playback method 33m may be changed by another control code.

The change patterns for the playback method 33m in the first to ninth operations described above may be changed when the target is detected a first time and the vehicle travels near the target and when the vehicle travels a second time or a subsequent time. It is possible to cause occupants of the vehicle to feel a fresh impression through the auditory sense. The change pattern of the playback method 33m in the first to ninth operations described above may be changed according to a season or a time. The occupants of the vehicle can feel an impression corresponding to the season or the time through the auditory sense. The change pattern of the playback method 33m in the first to ninth operations described above may be changed to another pattern at a timing of a designated time. For example, the designated time may be an exact time with no fraction of minutes and seconds, such as just 1 o'clock and just 2 o'clock. It is possible to cause an impression corresponding to the exact time of just each o'clock to be felt through the auditory sense.

The advantageous effects of the vehicle playback sound provision device 1 according to the first embodiment configured as described above will be described.

The vehicle playback sound provision device 1 according to the first embodiment is a vehicle playback sound provision device that provides the playback sound 34 based on the music piece in the vehicle, and includes a surrounding information detection device 40 that detects the detection information 28 including information on the three-dimensional object or the planar display around the traveling subject vehicle, and the control device 30 that determines the playback method 33m for the playback sound based on the detection information 28 when a predetermined target is included in the detection information 28. According to the configuration, the music piece can be played back using the playback method 33m determined based on the detection information 28 and output to the inside of the vehicle. Therefore, it is possible to provide the occupant of the vehicle with the music piece for which the playback method 33m changes from moment to moment according to the detection information 28, and it is possible to give a more sense of refreshment even for the same music piece.

In the vehicle playback sound provision device 1 according to the first embodiment, the playback method 33m includes at least one of playing back the playback sound by changing the amplitude of the playback sound, playing back the playback sound by changing the pitch of the playback sound, playing back the playback sound by changing the playback speed of the playback sound, playing back the playback sound by changing the progressing order of a plurality of parts obtained by dividing the playback sound by time, playing back the playback sound while changing the sound quality of the playback sound, playing back the playback sound by changing the dynamic range of the playback sound, playing back the playback sound by superimposing a delayed sound obtained by delaying the playback sound on the playback sound, and playing back the playback sound by superimposing a noise on the playback sound. According to the configuration, the characteristics of the playback sound can be widely changed.

The vehicle playback sound provision device 1 can change the playback method 33m based on form information related to at least one of a size, shape, color, type, and moved state of the target specified from the detection information 28. The vehicle playback sound provision device 1 can change the playback method 33m based on distance information related to a distance between the three-dimensional object specified from the detection information 28 and the vehicle. The vehicle playback sound provision device 1 can change the playback method 33m based on interval information related to an interval between the targets specified from the detection information 28. With the above-described characteristics, it is possible to give an enjoyment sense to occupants of the vehicle.

Second Embodiment

Figure 6:
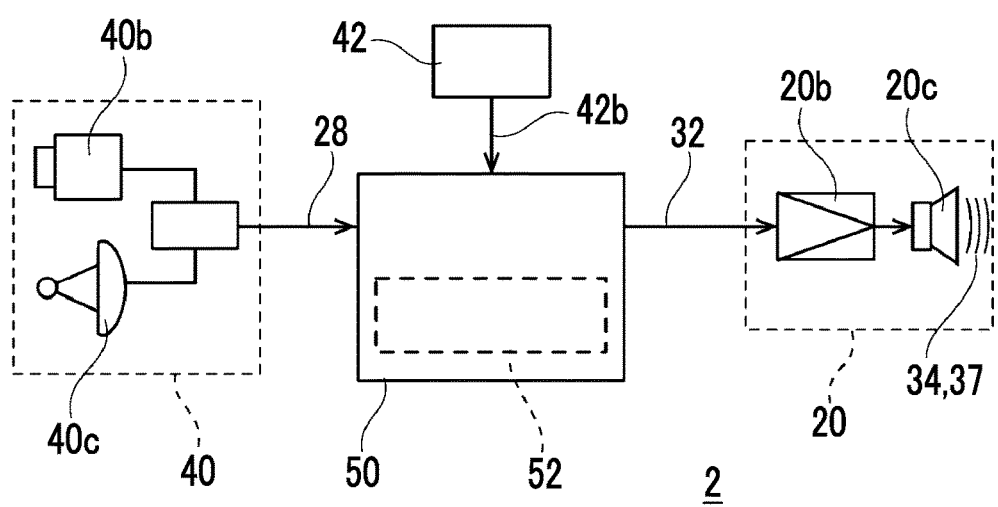
FIG. 6 is a block diagram illustrating a configuration of a vehicle playback sound provision device according to a second embodiment.

A vehicle playback sound provision device 2 according to a second embodiment will be described with reference to FIGS. 6 to 9. FIG. 6 is a block diagram illustrating an example of the configuration of the vehicle playback sound provision device 2 according to the second embodiment. As illustrated in FIG. 6, the vehicle playback sound provision device 2 mainly includes a music piece provision device 42, a surrounding information detection device 40, a control device 50, and a playback sound output device 20. The vehicle playback sound provision device 2 is different from the vehicle playback sound provision device 1 in that a control device 50 is included instead of the control device 30 of the vehicle playback sound provision device 1, and the other configurations are the same. The control device 50 differs from the control device 30 in that the control device 50 includes the sound effect provision unit 30a, and the other configurations are the same.

Figure 7:
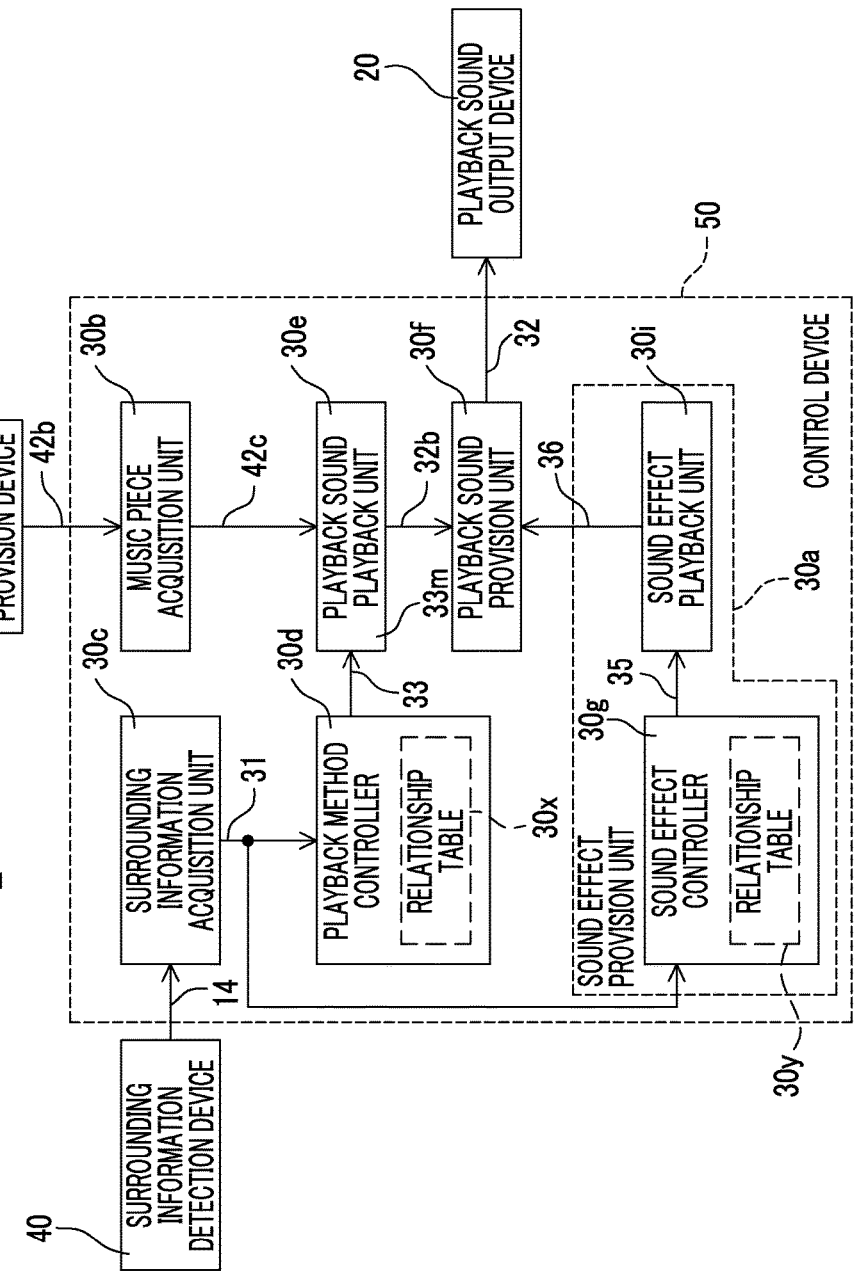
FIG. 7 is a block diagram illustrating a configuration of a control device of the vehicle playback sound provision device in FIG. 6.

The control device 50 will be described. FIG. 7 is a block diagram illustrating a configuration of the control device 50 of the vehicle playback sound provision device 2. As illustrated in FIG. 7, the control device 50 mainly includes a music piece acquisition unit 30b, a surrounding information acquisition unit 30c, a playback method controller 30d, a playback sound playback unit 30e, a playback sound provision unit 30f, a sound effect provision unit 30a. The playback method controller 30d includes a relationship table 30x. The sound effect provision unit 30a mainly includes a sound effect controller 30g and a sound effect playback unit 30i, and the sound effect controller 30g includes a relationship table 30y.

Sound Effect Provision Unit

The sound effect provision unit 30a provides a sound effect signal 36 to the playback sound provision unit 30f based on the detection information 28. The playback sound provision unit 30f superimposes the provided sound effect signal 36 on the playback sound signal 32 and provides a resultant signal to the playback sound output device 20. The sound effect controller 30g acquires the target code 31 and specifies the sound effect control signal 35 based on the acquired target code 31. The sound effect control signal 35 is a control signal for controlling the sound effect signal 36. The relationship table 30y is a database in which a relationship between the target code 31 and the sound effect control signal 35 is tabulated. It is possible to specify the sound effect control signal 35 by performing table processing by using the relationship table 30y using the target code 31 as a key. The sound effect controller 30g outputs the specified sound effect control signal 35 to the sound effect playback unit 30i. The sound effect playback unit 30i outputs a predetermined sound effect signal 36 to the playback sound provision unit 30f under control of the sound effect control signal 35.

Sound Effect Control Signal

Figure 8:
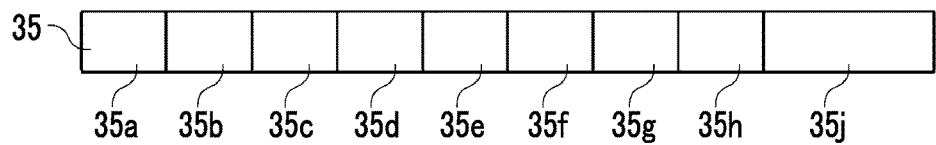
FIG. 8 is a conceptual diagram conceptually illustrating an example of a sound effect control signal of the vehicle playback sound provision device in FIG. 6.

The sound effect control signal 35 will be described. FIG. 8 is a conceptual diagram conceptually illustrating an example of the sound effect control signal 35. The sound effect control signal 35 includes, for example, an amplitude code 35a, a pitch code 35b, a speed code 35c, a progress code 35d, a filter code 35e, a D range code 35f, an echo code 35g, a noise code 35h, and a type code 35j. The sound effect control signal 35 controls the sound effect playback unit 30i, similar to the function of the playback method control signal 33 controlling the playback sound playback unit 30e.

The amplitude code 35a functions similarly to the amplitude code 33b, and controls a change pattern for changing the amplitude of the sound effect with time. The pitch code 35b functions similarly to the pitch code 33c, and controls a change pattern for changing the pitch with time without changing the playback speed of the sound effect. The speed code 35c functions similarly to the speed code 33d, and controls a change pattern for changing the playback speed with time without changing the pitch of the sound effect. The progress code 35d functions similarly to the progress code 33e, and controls a change pattern for changing a progressing order of a plurality of divided parts, in which the sound effect is divided into the parts through time division.

The filter code 35e functions similarly to the filter code 33f, and controls a change pattern for changing the sound quality of the sound effect with time. The D range code 35f functions similarly to the D range code 33g, and the D range code 35f controls a change pattern for changing the dynamic range of the sound effect with time. The echo code 35g is a control signal for superimposing the delayed sound on the sound effect, and functions similarly to the echo code 33h to control the change pattern of a delay time and an amplitude of the delayed sound. The noise code 35h functions similarly to the noise code 33j, and the noise code 35h is a control signal for superimposing noise on the sound effect, and controls a change pattern of a type and an amplitude of the noise.

The type code 35j is a code for controlling a type of sound effect to be played back by the sound effect playback unit 30i. The type of sound effect (hereinafter referred to as playback sound effect) played back by the sound effect playback unit 30i is not particularly limited. The playback sound effect may be, for example, an arrangement sound obtained by arranging a part of the music piece in a DJ style. For example, the playback sound effect may be a performance sound of a musical instrument such as a base sound and a drum sound, a sampling sound obtained by sampling a part of the music piece, a repetitive sound of the part of the music piece, and a repetitive sound of the same part before and after the part of the music piece (for example, scratch sound).

The playback sound effect may be a voice uttered by a person. For example, a voice uttering words indicating emotions such as joy, anger, grief, and pleasure, words indicating greetings, words indicating a state or a condition, words indicating a cue, words indicating a speech, and words indicating an imitation sound are included in the voice as described above. The playback sound effect may be, for example, a voice that is read by uttering text information using a singing method for hip-hop such as a rap tone (hereinafter simply referred to as a "rap-tone voice"). As an example, reading the text information in a rap tone includes rhythmically uttering the text information while suppressing a melody while rhyming, rhythmically uttering the textual information with strength and weakness, and uttering the text information with intonation according to a rhythm.

Tenth Operation

Figure 9:
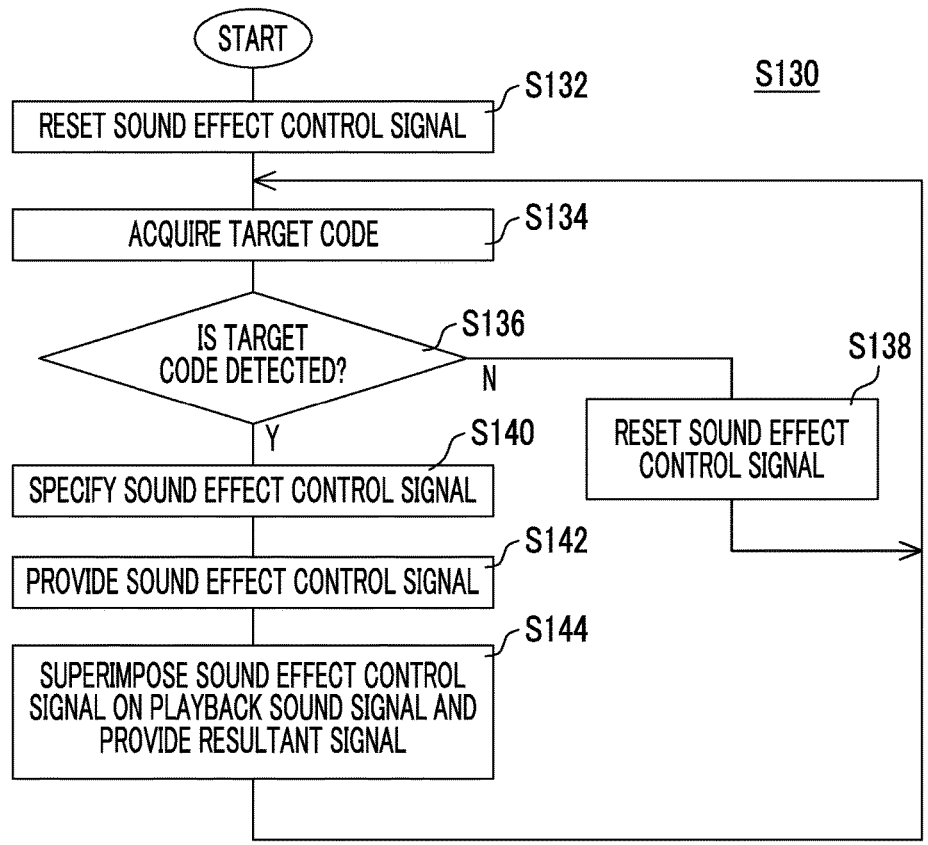
FIG. 9 is a flowchart illustrating an example of the operation of the vehicle playback sound provision device in FIG. 6.

An example of an operation of the vehicle playback sound provision device 2 according to the second embodiment configured as described above will be described. FIG. 9 is a flowchart illustrating a second operation of the vehicle playback sound provision device 2. The vehicle playback sound provision device 2 according to the second embodiment can execute the process S100 described in the first embodiment. The operation of FIG. 9 shows a sound effect process S130 that is executed in parallel with the steps S120 to S126 of the process S100 described in the first embodiment. The sound effect process S130 includes a process of specifying the sound effect control signal 35 based on the specified target code 31, generating the sound effect signal 36 according to the sound effect control signal 35, and outputting the sound effect signal 36 to the playback sound provision unit 30f.

The sound effect process S130 is started from a point at which the steps S102 to S120 of the process S100 described in the first embodiment are executed and the target code 31 is specified. When the sound effect process S130 is started, the control device 50 resets the sound effect control signal 35 (step S132). For example, in the reset sound effect control signal 35, the type code 35*j* is set to a state in which there is no sound effect. In this state, the sound effect is not superimposed on the playback sound 34.

When step S132 is executed, the sound effect controller 30*g* acquires the target code 31 (step S134). When the target code is acquired, the control device 50 determines whether or not the target code 31 is in a detected state (step S136). When the target code 31 is in a non-detected state (=not in the detected state) (N in step S136), the control device 50 executes step S138 to reset the sound effect control signal 35 (step S138). When step S138 is executed, the control device 50 returns the process to the start of step S134. While the loop of steps S134 to S138 is repeated, the sound effect is not superimposed on the playback sound 34.

When the target code 31 is in the detected state (Y in step S136), the sound effect controller 30*g* specifies the sound effect control signal 35 based on the target code 31 (step S140). For example, the sound effect controller 30*g* can specify the sound effect control signal 35 by performing table processing using the relationship table 30*y* using the target code 31 as a key. When step S140 is executed, the sound effect playback unit 30*i* provides the sound effect signal 36 generated based on the sound effect control signal 35 to the playback sound provision unit 30*f* (step S142). When the sound effect signal 36 is provided, the playback sound provision unit 30*f* superimposes the sound effect signal 36 on the playback sound signal 32 and provides a resultant signal to the playback sound output device 20 (step S144). When step S144 is executed, the control device 50 returns the process to the start of step S134. While a loop of steps S134 to S144 is repeated, the sound effect 37 superimposed according to the target code 31 is included in the playback sound 34. When the target code 31 changes to a non-detected state, the sound effect 37 included in the playback sound 34 disappears.

Eleventh Operation

An operation of the control device 50 will be described in an example in which a plurality of street lights provided at fixed intervals in a traveling direction is included in the detection information 28. The control device 50 may perform control so that the sound effect 37 in a predetermined aspect is included in the playback sound 34 when the vehicle passes by each street light. For example, the sound effect may be performance sound of an instrument such as striking sound of a percussion instrument. In this case, the control device 50 may cause the striking sound to be included in the playback sound 34 as the sound effect 37 each time the vehicle passes by each street light. In this case, the control device 50 can change the amplitude or the pitch of the sound effect 37 such as the striking sound using a control code such as the amplitude code 35*a* or the pitch code 35*b*. By doing as described above, the sound effect 37 changes rhythmically each time the vehicle passes through respective street lights arranged at equal intervals, and it is possible to realize passing by the street lights through the auditory sense, and enjoyment of driving increases. In the control as described above, another control code of the sound effect control signal 35 may be controlled. The control as described above can also be applied to other types of sound effects, and can also be applied to other targets.

Twelfth Operation

An operation of the control device 50 in an example in which a tunnel is included in the detection information 28 will be described. In this case, the control device 50 may perform control so that the sound effect 37 in the same aspect or a different aspect is included in the playback sound 34 in each of a case where the vehicle approaches the tunnel, a case where the vehicle enters the tunnel, a case where the vehicle passes through the tunnel, a case where the vehicle leaves the tunnel, and a case where the vehicle goes away from the tunnel. As an example, the sound effect may be a vocal sound or an imitation sound of words indicating emotions. For example, when the vehicle approaches the tunnel, the control device 50 may perform control so that a vocal sound such as "pit-a-pat" is included in the playback sound 34. For example, when the vehicle enters the tunnel, the control device 50 may perform control so that a vocal sound such as "feeling shock" is included in the playback sound 34. For example, when the vehicle passes through the tunnel, the control device 50 may perform control so that a vocal sound such as "throbbing" is included in the playback sound 34.

For example, when the vehicle leaves the tunnel, the control device 50 may perform control so that a vocal sound such as "Yeah" is included in the playback sound 34. For example, when the vehicle moves away from the tunnel, the control device 50 may perform control so that a vocal sound such as "Okay, nice" is included in the playback sound 34. In the above-described case, the control device 50 can change the amplitude or the pitch of the sound effect 37 such as the vocal sound or the imitation sound using a control code such as the amplitude code 35*a* or the pitch code 35*b*, for example. By doing as described above, each time the vehicle travels through the tunnel, an intonation of the vocal sound or the imitation sound changes. Thus, it is possible to realize through the auditory sense that the vehicle travels through the tunnel, and enjoyment of driving increases. In the control as described above, another control code of the sound effect control signal 35 may be controlled. The control as described above can also be applied to other types of sound effects, and can also be applied to other targets.

Thirteenth Operation

An operation of the control device 50 in an example in which a three-dimensional object at a destination is included in the detection information 28 will be described. In this case, the control device 50 may perform control so that the sound effect 37 in the same aspect or different aspect is included in the playback sound 34 in each of a case in which the vehicle approaches the three-dimensional object at the destination and a case in which the vehicle reaches the three-dimensional object at the destination. As an example, the sound effect may be a vocal sound or an imitation sound of words indicating emotions. For example, when the vehicle approaches the three-dimensional object at the destination, the control device 50 may perform control so that a vocal sound such as "exciting" is included in the playback sound 34. For example, when the vehicle reaches the three-dimensional object at the destination, the control device 50 may perform control so that a vocal sound indicating a delight such as "Wow, reached" is included in the playback sound 34.

In the above-described case, the control device 50 can change, for example, the amplitude or the pitch of the sound effect 37 such as the vocal sound or the imitation sound using the control code such as the amplitude code 35*a* and the pitch code 35*b*. By doing as described above, when the vehicle approaches and reaches the destination, an intonation of the vocal sound or the imitation sound changes. Thus, it is possible to realize an emotion when the vehicle approaches and reaches the destination through the auditory sense, and to further enhance elation. In the control as described above, another control code of the sound effect control signal 35 may be controlled. The control as described above can also be applied to other types of sound effects, and can also be applied to other targets.

Fourteenth Operation

An example of an operation in a case where the designated target is a division line for dividing a lane of a road will be described. When a division line which is an intermittent line is included in the detection information 28, the control device 50 may periodically change the sound effect at a timing according to the rhythm of a visual change according to an interval between division lines and a vehicle speed when the vehicle travels beside the division line. The sound effect changes rhythmically, and enjoyment of driving can be felt through the auditory sense. The control as described above can also be applied to other types of playback methods 33m, and can also be applied to other targets.

Other Operations

When a crosswalk is included in the detection information 28, the control device 50 may change the sound effect, for example, when the vehicle approaches the crosswalk. When the oncoming vehicle is included in the detection information 28, the control device 50 may change, for example, the sound effect corresponding to each of a case where an oncoming vehicle approaches the subject vehicle, a case where the oncoming vehicle passes by the subject vehicle, and the case where the oncoming vehicle moves away from the subject vehicle. For example, when parallel traveling vehicles are included in the detection information 28, the control device 50 may change the sound effect according to a visual change, for example, when the subject vehicle and the parallel traveling vehicle travel in parallel, when the parallel traveling vehicle overtakes the subject vehicle, and when the parallel traveling vehicle is overtaken by the subject vehicle. When a pedestrian or a bicycle is included in the detection information 28, the control device 50 may change the sound effect according to a visual change, for example, when the pedestrian or the bicycle is traveling in parallel, when the pedestrian or the bicycle overtakes the subject vehicle, and when the pedestrian or the bicycle is overtaken by the subject vehicle.

The sound effect in the above-described operation may be changed when the target is detected a first time and the vehicle travels near the target and when the vehicle travels a second time or a subsequent time. For example, the sound effect can be changed, like cymbal striking sound for the first time and drum striking sound for the second time. It is possible to cause occupants of the vehicle to feel a fresh impression through the auditory sense. The sound effect in the above-described operation may be changed according to a season or a time. The occupants of the vehicle can feel an impression corresponding to the season or the time through the auditory sense. The sound effect in the above-described operation may be changed to another sound effect at a timing of a designated time. For example, the designated time may be an exact time with no fraction of minutes and seconds, such as just 1 o'clock and just 2 o'clock. It is possible to cause an impression corresponding to the exact time of just each o'clock to be felt through the auditory sense.

Advantageous effects of the vehicle playback sound provision device 2 according to the second embodiment configured as described above will be described.

The vehicle playback sound provision device 2 according to the second embodiment is a vehicle playback sound provision device that provides playback sound based on a music piece in a vehicle, and includes a surrounding information detection device 40 that detects detection information 28 including information on a three-dimensional object or a planar display around a traveling subject vehicle, and a control device 50 that performs control so that a sound effect is included in the playback sound 34 based on the detection information 28 when a predetermined target is included in the detection information 28. According to the configuration, it is possible to provide the sound effect changing from moment to moment according to the detection information 28 by causing the sound effect determined based on the detection information 28 to be included in the playback sound. Therefore, it is possible to give a sense of refreshment to an occupant of the vehicle. By providing a changing sound effect, it is possible to provide the occupant of the vehicle with enjoyment of driving.

The vehicle playback sound provision device 2 can change the playback method 33m or the sound effect based on form information related to at least one of a size, shape, color, type, and moved state of the target specified from the detection information 28. The vehicle playback sound provision device 2 can change the playback method 33m or the sound effect based on distance information related to a distance between the three-dimensional object specified from the detection information 28 and the vehicle. The vehicle playback sound provision device 2 can change the playback method 33m or the sound effect based on interval information related to an interval between the targets specified from the detection information 28. With the above-described characteristics, it is possible to give an enjoyment sense to occupants of the vehicle.

The vehicle playback sound provision device 2 can cause an sound effect including at least one of a performance sound of a musical instrument, a sampling sound obtained by sampling a part of the music piece, a repetitive sound of the part of the music piece, and a repetitive sound of the same part before and after the part of the music piece to be included in the playback sound of the music piece. The vehicle playback sound provision device 2 can cause voice uttered by a person, such as a sound effect including at least one of words indicating emotions such as joy, anger, grief, and pleasure, words indicating greetings, words indicating a state or a condition, words indicating a cue, words indicating a speech, and words indicating an imitation sound to be included in the playback sound of the music piece. The vehicle playback sound provision device 2 can cause the sound effect including a rap-tone voice of text information to be included in the playback sound of the music piece. With the above-described characteristics, it is possible to give an enjoyment sense to the occupant of the vehicle.

Third Embodiment

Figure 10:
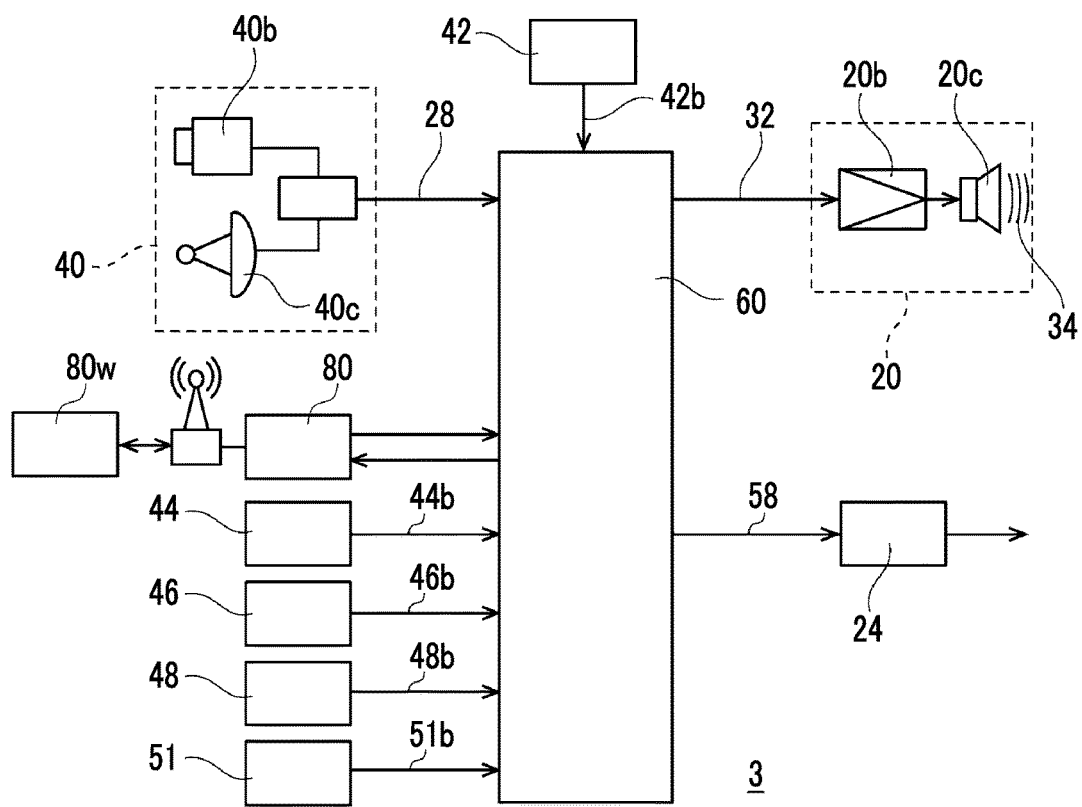
FIG. 10 is a block diagram illustrating a configuration of a vehicle playback sound provision device according to a third embodiment.
Figure 11:
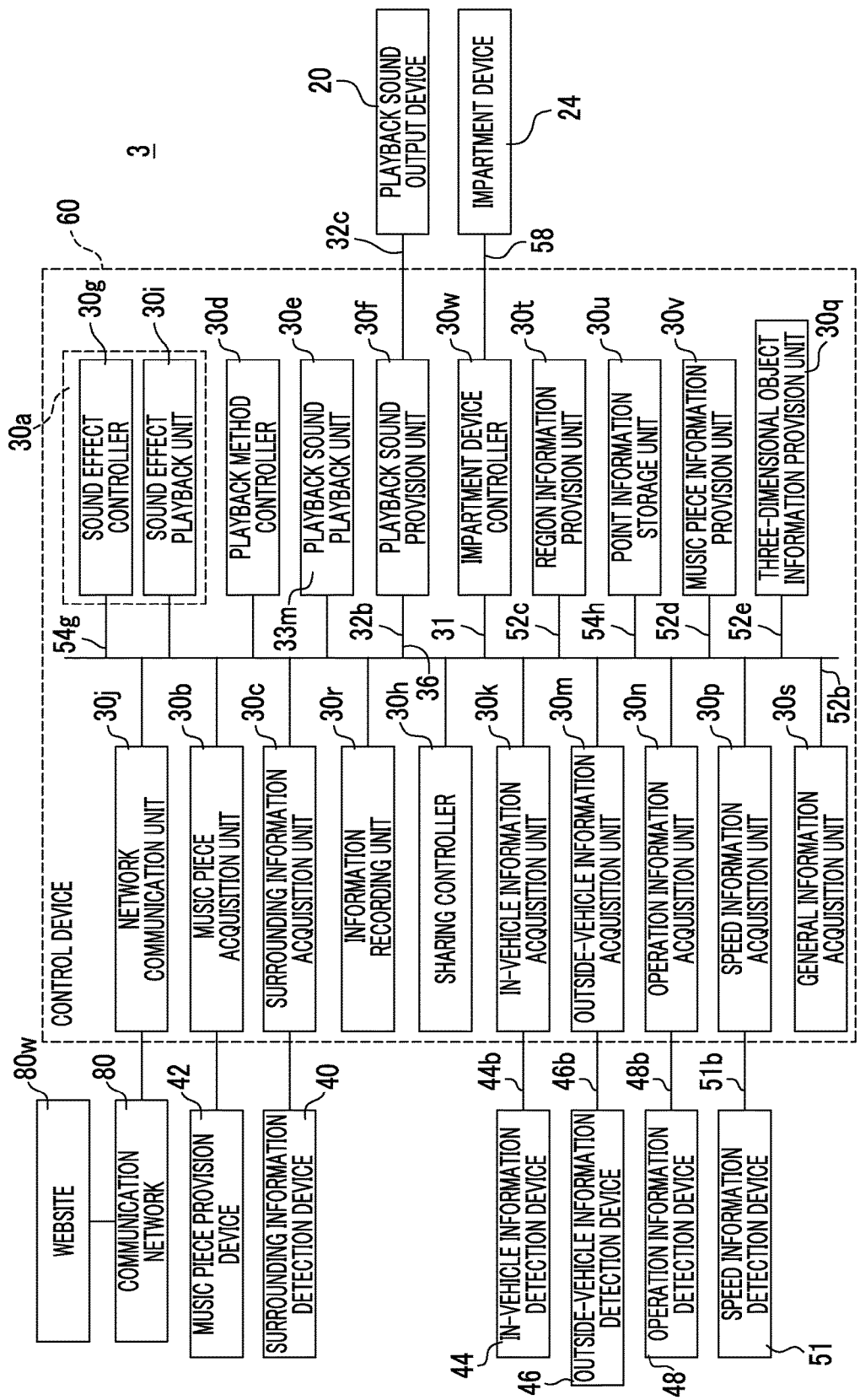
FIG. 11 is a block diagram illustrating a configuration of a control device of the vehicle playback sound provision device in FIG. 10.
Figure 12:
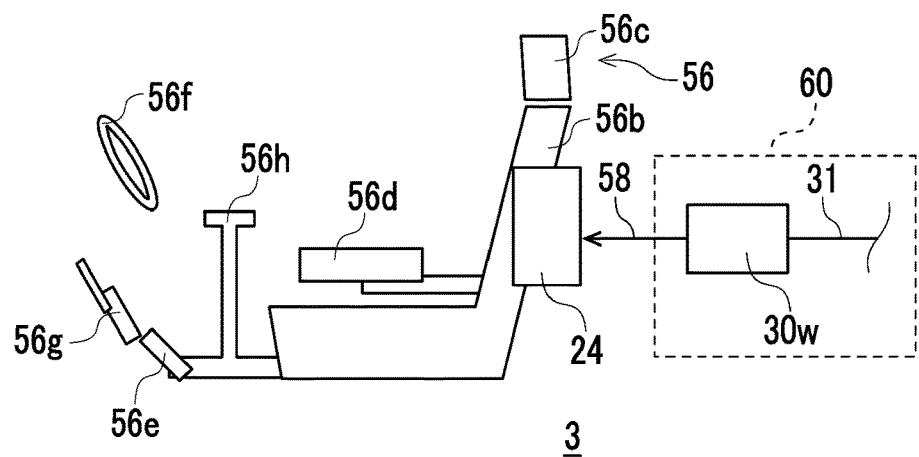
FIG. 12 is a schematic diagram illustrating surroundings of an impartment device of the vehicle playback sound provision device in FIG. 10.

A vehicle playback sound provision device 3 according to a third embodiment will be described with reference to FIGS. 10 to 12. FIG. 10 is a block diagram illustrating an example of a configuration of the vehicle playback sound provision device 3 according to the third embodiment. As illustrated in FIG. 10, the vehicle playback sound provision device 3 mainly includes a music piece provision device 42, a surrounding information detection device 40, a control device 60, a playback sound output device 20, an in-vehicle information detection device 44, an outside-vehicle information detection device 46, an operation information detection device 48, a speed information detection device 51, and an impartment device 24. The vehicle playback sound provision device 3 is different from that of the other embodiments in that the vehicle playback sound provision device 3 includes a control device 60 in place of the control device 30 of the vehicle playback sound provision device 1, and further includes the in-vehicle information detection device 44, the outside-vehicle information detection device 46, the operation information detection device 48, the speed information detection device 51, and the impartment device 24. The other configurations are the same.

The control device 60 will be described. FIG. 11 is a block diagram illustrating a configuration of the control device 60 of the vehicle playback sound provision device 3. As illustrated in FIG. 11, the control device 60 mainly includes a music piece acquisition unit 30b, a surrounding information acquisition unit 30c, a playback method controller 30d, a playback sound playback unit 30e, a playback sound provision unit 30f, a sound effect provision unit 30a, a network communication unit 30j, an in-vehicle information acquisition unit 30k, an outside-vehicle information acquisition unit 30m, an operation information acquisition unit 30n, a speed information acquisition unit 30p, a general information acquisition unit 30s, a region information provision unit 30t, a point information storage unit 30u, a music piece information provision unit 30v, a three-dimensional object information provision unit 30q, an impartment device controller 30w, an information recording unit 30r, and a sharing controller 30h.

Network Communication Unit

The network communication unit 30j is connected to a communication network 80 such as the Internet, and can acquire desired information over the communication network 80. The network communication unit 30j can transmit desired information to a website 80w connected to the communication network 80 such as the Internet. The website 80w may be a personal site, a membership site, or a non-membership open site. The website 80w may be, for example, a blog or a bulletin board. The website 80w may be a site that is provided by a social networking service (SNS) such as Twitter (registered trademark), Facebook (registered trademark), or LINE (registered trademark).

The control device 60 can upload desired information to the website 80w over the communication network 80. The control device 60 can download desired information from the website 80w over the communication network 80. With the above configuration, the control device 60 can post desired information on the site that is provided by the SNS using the network communication unit 30j. The information posted on the site as described above can be shared with other people such as other users. The control device 60 can download information posted by other users or the like from the site that is provided by the SNS using the network communication unit 30j.

The in-vehicle information detection device 44 detects in-vehicle information 44b including at least one of the brightness in the vehicle, the number of occupants, a sound pressure level, and speech sound. The in-vehicle information detection device 44 may include an in-vehicle camera, a light sensor, a human sensor, a sound pressure sensor, and the like. The in-vehicle information acquisition unit 30k acquires the in-vehicle information 44b detected by the in-vehicle information detection device 44. The control device 60 can change the playback method 33m for the playback sound 34 by controlling the playback method controller 30d based on the acquired in-vehicle information 44b. For example, when the brightness in the vehicle changes, the control device 60 can change the playback method 33m for the amplitude or the pitch of the playback sound 34 using a control code such as the amplitude code 33b or the pitch code 33c.

The control device 60 can control the sound effect controller 30g based on the acquired in-vehicle information 44b to change the sound effect to be included in the playback sound 34. For example, when external light is inserted into the vehicle and the brightness in the vehicle changes, the control device 60 can cause a predetermined sound effect to be included in the playback sound 34.

The outside-vehicle information detection device 46 detects outside-vehicle information 46b including at least one of brightness of the outside of the vehicle, a sound pressure level, and the amount of precipitation. The outside-vehicle information detection device 46 may include a light sensor, a sound pressure sensor, a precipitation sensor, and the like. The outside-vehicle information acquisition unit 30m acquires the outside-vehicle information 46b detected by the outside-vehicle information detection device 46. The control device 60 can change the playback method 33m for the playback sound 34 by controlling the playback method controller 30d based on the acquired outside-vehicle information 46b. For example, when the brightness of the outside of the vehicle has changed, the control device 60 can change the playback method 33m for the amplitude or the pitch of the playback sound 34 using a control code such as the amplitude code 33b or the pitch code 33c.

The control device 60 can control the sound effect controller 30g based on the acquired outside-vehicle information 46b to change the sound effect to be included in the playback sound 34. For example, when the precipitation outside the vehicle has been detected, the control device 60 can cause the predetermined sound effect to be included in the playback sound 34.

The operation information detection device 48 detects operation information 48b including an operated state of at least one of a steering wheel, an operation pedal, and an operation lever of the vehicle. The operation information detection device 48 may include an angle sensor or the like. The operation information acquisition unit 30n acquires the operation information 48b detected by the operation information detection device 48. The control device 60 can change the playback method 33m for the playback sound 34 by controlling the playback method controller 30d based on the acquired operation information 48b.

The control device 60 can control the sound effect controller 30g based on the acquired operation information 48b to change the sound effect to be included in the playback sound 34. For example, the control device 60 can cause the sound effect changing according to the operation of the steering wheel to be included in the playback sound 34.

The speed information detection device 51 detects speed information 51b including at least one of a speed, an acceleration, a yaw rate, and a yawing acceleration of the vehicle. The speed information detection device 51 can include a speed sensor, an acceleration sensor, or the like. The speed information acquisition unit 30p acquires the speed information 51b detected by the speed information detection device 51. The control device 60 can change the playback method 33m for the playback sound 34 by controlling the playback method controller 30d based on the acquired speed information 51b.

The control device 60 can control the sound effect controller 30g based on the acquired speed information 51b to change the sound effect to be included in the playback sound 34. For example, the control device 60 can cause a sound effect changing according to a change in the yawing acceleration to be included in the playback sound 34.

The general information acquisition unit 30s acquires general information 52b including at least one of astronomical information, weather information, and news information from the communication network 80 via the network communication unit 30*j*. For example, the general information acquisition unit 30*s* may acquire news. The region information provision unit 30*t* acquires region information 52*c* related to a region in which the vehicle travels from the communication network 80 via the network communication unit 30*j*. For example, the region information provision unit 30*t* may acquire a name of the region. The music piece information provision unit 30*v* acquires music piece information 52*d* of the music piece from the communication network 80 via the network communication unit 30*j*. For example, the music piece information provision unit 30*v* may acquire the name of the music piece. The music piece information provision unit 30*v* can acquire the music piece information 52*d* of the music piece provided by the music piece provision device 42, for example. The three-dimensional object information provision unit 30*q* acquires three-dimensional object information 52*e* of a three-dimensional object around the traveling subject vehicle from the communication network 80 via the network communication unit 30*j*. The three-dimensional object information provision unit 30*q* may acquire, for example, a name of the three-dimensional object.

The control device 60 is configured to control the sound effect controller 30*g* to cause reading voice 54*g* of text information extracted from at least one of the general information 52*b*, the region information 52*c*, the music piece information 52*d* of the music piece, and the three-dimensional object information 52*e* of the three-dimensional object that have been acquired to be included as the sound effect in the playback sound 34. The reading voice 54*g* may be rap-tone voice of the above-described text information.

The point information storage unit 30*u* stores point information 54*h* regarding a point at which the vehicle has traveled. For example, the point information 54*h* may include information such as the number of times the vehicle has passed through the point, a season in which the vehicle has passed through the point, a time when the vehicle has passed through the point, weather when the vehicle has passed through the point, and brightness when the vehicle has passed through the point. The control device 60 can change the playback method 33*m* for the playback sound 34 by controlling the playback method controller 30*d* based on the point information 54*h*. For example, the control device 60 can perform changing to a different playback method 33*m* for each number of times the vehicle has passed through the point. The control device 60 can control the sound effect controller 30*g* based on the point information 54*h* to change the sound effect to be included in the playback sound 34. For example, the control device 60 can cause a different sound effect to be included in the playback sound 34 for each number of times the vehicle passes through the point.

Impartment Device

The impartment device 24 will be described with reference to FIGS. 10 to 12. FIG. 12 is a schematic diagram illustrating the surroundings of the impartment device 24 of the vehicle playback sound provision device 3. The impartment device 24 imparts a vibration or a motion to a vehicle-mounted member 56 which is at least one member among a seat 56*b*, a headrest 56*c*, an armrest 56*d*, a footrest 56*e*, a steering wheel 56*f*, an operation pedal 56*g*, and an operation lever 56*h* of the vehicle. The impartment device 24 may include, for example, an electric actuator or a vibration generator.

When a predetermined target is included in the detection information 28, the impartment device controller 30*w* controls the impartment device 24 so that the impartment device 24 imparts vibration or motion to the vehicle-mounted member 56 based on the detection information 28. The impartment device controller 30*w* acquires the target code 31 and specifies the impartment device control signal 58 based on the acquired target code 31. The impartment device control signal 58 is a control signal for controlling the impartment device 24. The impartment device control signal 58 can specify the impartment device control signal 58 through, for example, table processing. The impartment device control signal 58 may include a control signal for specifying the vehicle-mounted member 56 to which vibration or motion is imparted, a control signal for specifying a type of vibration or motion to be imparted, and a control signal for specifying a pattern of an amplitude or a frequency of the vibration or the motion to be imparted. The impartment device controller 30*w* outputs the specified impartment device control signal 58 to the impartment device 24. The impartment device 24 is controlled by the impartment device control signal 58 to impart vibration or motion to the desired vehicle-mounted member 56. For example, the control device 60 may perform control to vibrate the armrest 56*d* when the vehicle leaves a tunnel. With the characteristics, it possible to give an enjoyment sense to the occupant of the vehicle.

Information Recording Unit

The information recording unit 30*r* can record images obtained by imaging the surroundings of the vehicle or the inside of the vehicle. The information recording unit 30*r* can record music pieces, playback sound, sound effect, and other sounds. The information recording unit 30*r* can record the playback method control signal 33 and the sound effect control signal 35 (hereinafter referred to as arrangement information). The arrangement information may be information indicating the specific aspect 33*n* of the playback method 33*m*. The information recording unit 30*r* can record one of a plurality of pieces of information among the detection information 28, the region information 52*c*, the point information 54*h*, the music piece information 52*d*, the three-dimensional object information 52*e*, the in-vehicle information 44*b*, the outside-vehicle information 46*b*, the speed information 51*b*, the operation information 48*b*, and the general information 52*b*.

The control device 60 may post some or all of the still images and moving images recorded on the information recording unit 30*r* on the website 80*w* as sharable information using the network communication unit 30*j*. The control device 60 can post some or all of the playback sound and the voice recorded on the information recording unit 30*r* on the website 80*w* as sharable information using the network communication unit 30*j*. The control device 60 can post some or all of the detection information 28, the region information 52*c*, the point information 54*h*, the music piece information 52*d*, the three-dimensional object information 52*e*, the in-vehicle information 44*b*, the outside-vehicle information 46*b*, the speed information 51*b*, the operation information 48*b*, and the general information 52*b* recorded on the information recording unit 30*r* on the website 80*w* as sharable information using the network communication unit 30*j*. The control device 60 can post the specific aspect 33*n* of the playback method 33*m* on the website 80*w* as sharable information using the network communication unit 30*j*.

The above-described information (hereinafter referred to as sharing information 80*b*) posted on the website 80*w* can be shared socially over an information network such as the Internet. By doing as described above, when a person who has seen the posted sharing information 80*b* goes to the same place, the person can do the same experience through a sharing function to be described below.

Sharing Controller

The sharing controller 30h controls a sharing function in the control device 60. The sharing function is a function of acquiring the sharing information 80b posted on the website 80w by another person such as another user and reproducing the sharing information 80b in the subject vehicle. A specific aspect 33n of the playback method 33m, image information such as a still image or a moving image, sound information such as playback sound or voice, the detection information 28, the region information 52c, the point information 54h, the music piece information 52d, the three-dimensional object information 52e, the in-vehicle information 44b, the outside-vehicle information 46b, the speed information 51b, the operation information 48b, and the general information 52b may be included in the sharing information 80b.

The sharing controller 30h can acquire the sharing information 80b from the website 80w over the communication network 80 such as the Internet. As an example, the control device 60 can determine or change the playback method 33m based on the sharing information 80b acquired in the sharing controller 30h. As another example, the control device 60 can play back the playback sound 34 based on the specific aspect 33n of the playback method 33m acquired in the sharing controller 30h.

As still another example, the control device 60 can determine or change the sound effect 37 based on the sharing information 80b acquired by the sharing controller 30h. As still another example, the control device 60 can cause the sound effect 37 to be included in the playback sound 34 based on the specific aspect 33n of the playback method 33m acquired in the sharing controller 30h. As still another example, the control device 60 can specify at least one of the playback method control signal 33, the sound effect control signal 35, and the impartment device control signal 58 according to the sharing information 80b.

The control device 60 can generate the playback sound signal 32 based on the playback method control signal 33 specified from the sharing information 80b and provide the playback sound signal 32 to the playback sound output device 20. The control device 60 can cause the sound effect to be included in the playback sound signal 32 based on the sound effect control signal 35 specified from the sharing information 80b and provide a resultant playback sound signal 32 to the playback sound output device 20. The control device 60 can control the impartment device 24 using the impartment device control signal 58 specified from the sharing information 80b. By doing as described above, when the subject vehicle travels at a place visited by, for example, a user who has posted the sharing information 80b, the same playback sound and the same sound effect as for the posting person, the same operation of the impartment device 24, and the like can be experienced in common.

In this case, for example, distribution of application software for uploading information for reproducing a playback method or a sound effect based on a predetermined arrangement (hereinafter referred to as arrangement information) to the website 80w and downloading the information from the website 80w is conceivable. Uploading a specific arrangement information created by a specific person (for example, a famous DJ or arranger) to the website 80w is conceivable. The specific arrangement information can be acquired through downloading or the like by a person satisfying predetermined conditions. It is possible to induce a person who desires to acquire the specific arrangement information (for example, a fan of a specific person) so that the person satisfies the predetermined conditions. As an example, visiting a predetermined place, traveling on a predetermined road, or the like can be used as acquisition conditions of the specific arrangement information. By doing so, it is possible to induce people to a place or a load (for example, a local road) that people are desired to visit. It is possible to increase a possibility of people visiting the place in order to acquire the specific arrangement information.

Characteristics of the vehicle playback sound provision device 3 configured as described above will be described. The vehicle playback sound provision device 3 can change the playback method 33m for the playback sound or the sound effect based on the point information related to the point at which the vehicle travels. The vehicle playback sound provision device 3 can change the playback method 33m for the playback sound or the sound effect based on the in-vehicle information including at least one of the brightness in the vehicle, the number of occupants, a sound pressure level, and speech sound. The vehicle playback sound provision device 3 can change the playback method 33m for the playback sound or the sound effect based on the outside-vehicle information including at least one of brightness of the outside of the vehicle, a sound pressure level, and the amount of precipitation.

The vehicle playback sound provision device 3 can change the playback method 33m for the playback sound or the sound effect based on the operation information including an operated state of at least one of a steering wheel, an operation pedal, and an operation lever of the vehicle. The vehicle playback sound provision device 3 can change the playback method 33m for the playback sound or the sound effect based on the speed information including at least one of a speed, an acceleration, a yaw rate, and a yawing acceleration of the vehicle. The vehicle playback sound provision device 3 can change the playback method 33m for the playback sound or the sound effect based on the general information including at least one of astronomical information, weather information, and news information acquired from the communication network. With the above-described characteristics, it is possible to give an enjoyment sense to the occupant of the vehicle.

According to the vehicle playback sound provision device 3, the rap-tone voice of the text information acquired from the communication network can be included as a sound effect in the playback sound of the music piece. By causing the rap-tone voice of the text information to be included in the playback sound, it is possible to give an enjoyment sense to the occupant of the vehicle.

The present disclosure has been described based on each embodiment. Those skilled in the art will appreciate that the above-described embodiments are illustrative, various modifications and changes can be performed within the claims of the present disclosure, and such modification examples and changes are also within the claims of the present disclosure. Accordingly, the description and the drawings herein are to be regarded as illustrative rather than restrictive.

Hereinafter, modification examples will be described. In drawings and description of the modification examples, the same or equivalent components and members as those in the embodiments are denoted with the same reference numerals. Description that is the same as those in the embodiments will be appropriately omitted, and configurations different from those of the embodiments will be mainly described.

First Modification Example

In each of the embodiments, the example in which the control is started after the target of interest is recognized by the surrounding information detection device 40 such as a camera has been described, but the present disclosure is not limited to this example. For example, for a static target, a target of interest may be recognized in advance based on position information of a global positioning system (GPS) or the like and map information. In this case, the control of the playback method 33*m* or the sound effect for the static target may be executed until the vehicle passes the target and the target disappears from the field of view of the camera after the presence of the target in the field of view of the camera is confirmed.

Second Modification Example

In each of the embodiments, an example in which the same control as other targets is performed on a target visible from a long distance, such as a relatively large tower or bridge, has been described, but the present disclosure is not limited thereto. For example, the playback method 33*m* or the sound effect may be changed in a stepwise manner or gradually until the vehicle approaches the target to a short distance from a long distance for the target visible from a long distance, such as the relatively large tower or bridge. In this case, when the target is at the long distance, the playback sound may be closer to the normal playback sound than when the target is at the short distance.

Third Modification Example

In each of the embodiments, the example in which the predetermined control is performed on each target has been described, but the present disclosure is not limited to this example. For example, even for the same target, the playback method 33*m* and each sound effect may be changed in a case where the vehicle is close to the destination and a case where the vehicle is far from the destination. By performing the control as described above, the occupant of the vehicle can easily recognize that the vehicle is close to the destination. It is possible to raise feeling of the occupant of the vehicle as the occupant gets closer to the goal.

Fourth Modification Example

In the second embodiment, the example in which one type of sound effect is simultaneously included in the playback sound has been described, but the present disclosure is not limited to this example. The control device 50 may control the sound effect playback unit so that a plurality of sound effects is simultaneously included in the playback sound. For example, a sound effect of a musical instrument sound and a reading voice such as "yeah" may be simultaneously included in the playback sound.

Fifth Modification Example

In each of the embodiments, the example in which the sound effect is included based on the information on the three-dimensional object has been described, but the present disclosure is not limited to this example. Text information registered in a social networking service (SNS) or the like may be acquired from map information over a communication network (for example, the Internet) with respect to a commercial facility, a scenic spot, or the like around the traveling subject vehicle. For example, information of a surrounding commercial facility, scenic spot, or the like may be acquired from the map information, and text information registered in an SNS or the like linked to the acquired information may be acquired. A rap-tone voice of a text obtained by arranging the acquired text information may be included as a sound effect in the playback sound of the music piece. In this case, intonation of the sound effect may be changed according to the intonation of the music piece.

Sixth Modification Example

In each of the embodiments, the example in which the three-dimensional object is captured by the surrounding information detection device 40 such as a camera has been described, but the present disclosure is not limited to this example. A name of the three-dimensional object or the like may be acquired from map information or web information opened on the Internet (hereinafter simply referred to as web information), and may be included in the playback sound of the music piece, with the rap-tone voice of the acquired text information as the sound effect. In this case, the intonation of the sound effect may be changed according to the intonation of the music piece.

Seventh Modification Example

For example, text information such as names of surrounding facilities may be acquired from the map information or the web information from position information such as a GPS without performing recognition using a sensor such as a camera. In this case, the rap-tone voice of the text information acquired from the web information may be included as the sound effect in the playback sound of the music piece. In this case, the intonation of the sound effect may be changed according to the intonation of the music piece.

Eighth Modification Example

In each embodiment, the example in which the music piece provision device 42 provides the music piece based on various media as a sound source has been described, but the present disclosure is not limited thereto. The music piece provision unit may provide an electronic code for controlling the electronic musical instrument as a sound source. For example, an electronic musical instrument may be included in the controller, an electronic code such as MIDI may be provided as a sound source from the music piece provision unit, an electronic musical instrument of the controller may be controlled by the electronic code to generate a music piece signal, and the playback sound playback unit may play back the music piece.

Ninth Modification Example

Although not specifically described in each embodiment, a configuration in which the specific aspect 33*n* of the playback method 33*m* for the playback sound based on the detection information 28 can be changed by a user such as the occupant of the vehicle, and the specific aspect 33*n* of the playback method 33*m* changed by the user can be stored may be adopted. For example, the control device 60 can store the specific aspect 33*n* of the changed playback method 33*m* in the information recording unit 30*r*. With the configuration as described above, since it is possible to change the specific aspect 33*n* of the playback method 33*m* according to preference of the user, it is possible to further enhance enjoyment of driving. The specific aspect 33*n* of the playback method 33*m* may be expressed by at least one of the playback method control signal 33 and the sound effect control signal 35.

Tenth Modification Example

Figure 13:
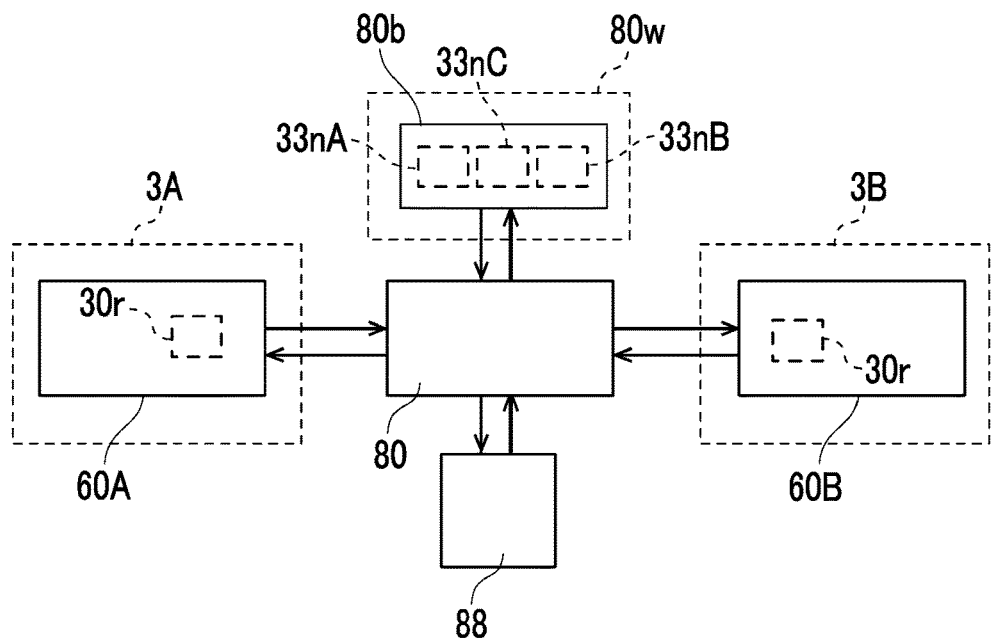
FIG. 13 is a block diagram illustrating tenth to twelfth modification examples.

Although not particularly described in each embodiment, a configuration in which the specific aspect 33*n* of the playback method 33*m* changed by the user can be transmitted over the communication network 80 may be adopted. FIG. 13 is a block diagram illustrating tenth to twelfth modification examples. FIG. 13 conceptually illustrates surroundings of the communication network 80. Two vehicle playback sound provision devices 3 and a shared website 80*w* are connected to the communication network 80. In order to distinguish the two vehicle playback sound provision devices 3 from each other, the two vehicle playback sound provision devices 3 are referred to as vehicle playback sound provision devices 3A, 3B. The vehicle playback sound provision devices 3A, 3B are mounted on separate vehicles (for example, the subject vehicle and another vehicle). With the configuration as described above, the vehicle playback sound provision device 3A can upload information of a specific aspect 33*n*A to the website 80*w* over the communication network 80, and the vehicle playback sound provision device 3B can upload information of a specific aspect 33*n*B to the website 80*w* over the communication network 80. As described above, the information of the specific aspects 33*n*A, 33*n*B can be shared in the respective vehicles through a site of an SNS or the like.

Eleventh Modification Example

Although not particularly described in each embodiment, a configuration in which a specific aspect 33*n* of the playback method 33*m* can be acquired from the communication network 80 may be adopted. In the example of FIG. 13, the vehicle playback sound provision device 3B can acquire the specific aspect 33*n*A uploaded from the vehicle playback sound provision device 3A. The vehicle playback sound provision device 3A can acquire the specific aspect 33*n*B uploaded from the vehicle playback sound provision device 3B. With the configuration as described above, it is possible to acquire the specific aspect 33*n* of the playback method 33*m* changed by another user, and reproduce experience of another user in the subject vehicle. That is, users can share experiences.

Twelfth Modification Example

Although not particularly described in each embodiment, the website 80*w* may be configured such that an information provider can upload the specific aspect 33*n* of the playback method 33*m* using an information provision system 88. In the example of FIG. 13, the information provider can upload a specific aspect 33*n*C of the playback method 33*m* created by the information provider to the website 80*w* using the information provision system 88 connected to the communication network 80. The vehicle playback sound provision devices 3A, 3B can acquire the specific aspect 33*n*C uploaded from the information provision system 88. With the configuration as described above, the specific aspect 33*n*C created by the information provider is uploaded to the website 80*w*, and a person satisfying predetermined conditions can acquire and experience the specific aspect 33*n*C.

According to each of the modification examples described above, the same advantageous effects as those of the respective embodiments are achieved.

Any combination of the above-described embodiments and any combination of each embodiment and each modification example are also useful as embodiments of the present disclosure. New embodiments resulting from the combination have the respective effects of the combined embodiments and modification examples.

What is claimed is:

1. A playback sound provision device comprising:
   a detector configured to detect detection information including information on a three-dimensional object or a planar display around a vehicle; and
   a processor programmed to
      determine a playback method for a playback sound based on a music piece based on the detection information when a predetermined target is included in the detection information, and
      provide the playback sound based on the playback method, wherein
   the playback method includes at least one of
      playing back the playback sound by changing an amplitude of the playback sound,
      playing back the playback sound by changing a pitch of the playback sound,
      playing back the playback sound by changing a playback speed of the playback sound,
      playing back the playback sound by changing a progressing order of a plurality of parts obtained by dividing the playback sound by time,
      playing back the playback sound by changing sound quality of the playback sound,
      playing back the playback sound by changing a dynamic range of the playback sound,
      playing back the playback sound by superimposing a delayed sound obtained by delaying the playback sound on the playback sound, and
      playing back the playback sound by superimposing a noise on the playback sound.

2. The playback sound provision device according to claim 1, wherein:
   a specific aspect of the playback method for the playback sound based on the detection information is changed by a user; and
   the playback sound provision device is configured to store the specific aspect of the playback method for the playback sound changed by the user.

3. The playback sound provision device according to claim 2, wherein the playback sound provision device is configured to transmit the specific aspect of the playback method for the playback sound changed by the user to a communication network.

4. The playback sound provision device according to claim 2, wherein the playback sound provision device is configured to acquire the specific aspect of the playback method for the playback sound from a communication network.

5. A playback sound provision device comprising:
   a detector configured to detect detection information including information on a three-dimensional object or a planar display around a vehicle; and
   a processor programmed to playback a playback sound based on a music piece based on the detection information when a predetermined target is included in the detection information, the playback sound including a sound effect.

6. The playback sound provision device according to claim 5, wherein the sound effect includes voice obtained by reading text information acquired from a communication network in a rap tone.

* * * * *